United States Patent

[11] 3,588,335

[72] Inventors Halbert M. Harris;
Franklin L. Headd; Ralph R. Tilly, Webster; Charles L. Huber, Marion; Robert H. Rugaber, Pittsford, N.Y.
[21] Appl. No. 758,932
[22] Filed Sept. 11, 1968
[45] Patented June 28, 1971
[73] Assignee Xerox Corporation
Rochester, N.Y.

[54] FACSIMILE TRANSCEIVER APPARATUS
25 Claims, 16 Drawing Figs.

[52] U.S. Cl. .......... 178/6.6, 178/6, 178/7.6
[51] Int. Cl. .......... H04n 1/02, H04n 1/12, H04n 1/24
[50] Field of Search .......... 178/6, 7.6, 6.6, 6.6 (A); 346/74 (ES), 74 (ESX)

[56] References Cited

UNITED STATES PATENTS

| | | | |
|---|---|---|---|
| 2,567,307 | 9/1951 | Wise | 178/7.6 |
| 2,951,121 | 8/1960 | Conrad | 346/74ESX |
| 3,325,821 | 6/1967 | Reese | 178/6.6 |
| 3,484,792 | 12/1969 | Gold | 346/74ES |

*Primary Examiner*—Bernard Konick
*Assistant Examiner*—Howard W. Britton
*Attorneys*—Paul M. Enlow, Ronald Zibelli, James J. Ralabate, Norman E. Schrader and Terry J. Anderson ABSTRACT: A facsimile transceiver apparatus for use in a facsimile system to convert information on record media into electrical signals for transmission to a remote location in a transmit mode and to convert electrical signals received from a remote location into representative information on record media in a receive mode. Information is scanned and recorded at a scanning station axially located along a passageway having an arcuate configuration in a lateral direction and a linear configuration in a longitudinal direction. A support member having optical scanning means and electrographic recording means operatively associated therewith is rotatable about the longitudinal axis of the passageway at the scanning station. In the transmit mode, a document containing information to be transmitted is advanced into the passageway by an automatic document transport system and upon rotation of the support member, electrical signals representative of the information are generated for transmission as the optical scanning means traverses the document.

In the receive mode, a copy sheet onto which information is to be recorded is advanced into the passageway by an automatic copy sheet transport system and upon rotation of the support member, electrostatic charge patterns are produced on the copy sheet in response to received electrical signals as the electrographic recording means traverses the copy sheet. The charge patterns of information on the copy sheet are rendered visible by means of an electrostatic powder developing apparatus which uniformly deposits a quantity of powder marking particles onto the surface of the electrostatically charged copy sheet. The developed image is then fused to the surface of the record media to provide a permanent facsimile copy of the received information.

INVENTORS
HALBERT M. HARRIS
FRANKLIN L. HEADD
CHARLES L. HUBER
ROBERT H. RUGABER
RALPH R. TILLY

BY Terry J. Anderson
ATTORNEY

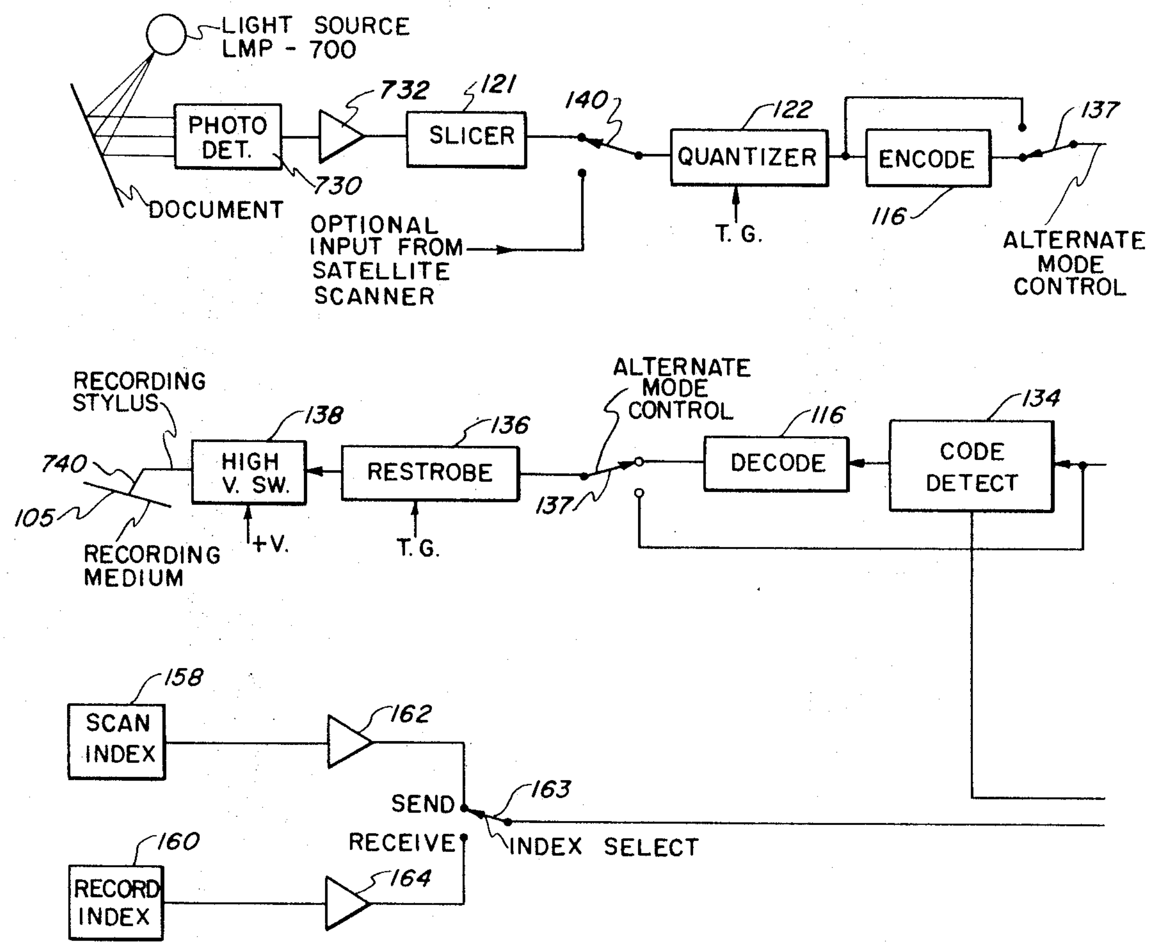
FIG. 15
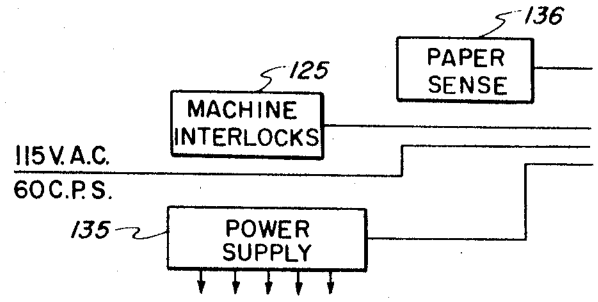

FACSIMILE TRANSCEIVER APPARATUS

BACKGROUND OF THE INVENTION

This invention relates generally to facsimile systems and more particularly to facsimile transceivers adapted to operate through a transmitting medium of limited bandwidth capability.

In the art of facsimile, recorded graphic information at a first location may be transmitted to a second location remote from the first location by wire or radio for reproducing an exact copy of the original graphic information at the second location. In prior facsimile systems, the graphic information to be transmitted has included photographs, drawings, and business letters, as well as other types of recorded information. In a typical facsimile system, documents, for example, which are to be transmitted are scanned at a transmitting station to convert the information contained thereon into a series of electrical or video signals. These video signals are then coupled to the input of a communication link or transmitting medium which interconnects the transmitter with a receiver. At the receiving station, the electrical or video signals in conjunction with suitable synchronizing signals selectively control the actuation of a recording means whereby to generate a facsimile of the transmitted information.

In recent years, graphic communication has reached unprecedented levels. In the business community alone, the increased correspondence has reached such levels in many instances, to substantially detract from an otherwise efficient and well-planned business operation. In an effort to achieve faster communication of graphic information, the use of facsimile systems has likewise increased. However, the usage of such systems for communication has not increased in proportion to the need, the reason being largely due to the requirements of quick and accurate service as well as an attendant low-cost operation.

The problem of achieving rapid transmission service considered alone has not presented great difficulties. However, when coupled with the low cost requirement, rapid transmission service has been difficult to attain. A principal factor which has impeded low-cost rapid transmission service is that in order to maintain picture resolution and signal quality at a desirably high level, the usage of a large bandwidth capability transmission medium has been required. The usage of such media in transmitting the large signal densities have thus resulted, in many instances, in a prohibitively high cost to the user. Without the use of the high capacity transmission medium, the document transmission time increases, or alternatively, the number of documents per unit time transmitted decreases accordingly. It is therefore apparent that the high cost of such transmission line service or increase in document transmission time becomes a serious limitation on the economic usefulness of the facsimile equipment.

In addition, it is many times desirable to transmit information to parties other than those that may exist on a closed transmission network. Thus, the existing world wide telephone network provides an attractive means for transmitting graphic information with an attendant relatively low cost, extensive subscriber service, and the fact that no other transmission medium need be installed, notwithstanding the limited bandwidth capability thereof.

Accordingly, facsimile systems such as that disclosed in copending application Ser. No. 572,493 filed Aug. 15, 1966, in the names of Woodward et al. and assigned to the same assignee as the instant application have been devised which transmit binary data information over switched telephone lines, efficiently utilizing the bandwidth capabilities thereof for transmitting graphic information. These same systems have the added versatility of transmitting graphic information over switched telephone networks utilizing the common telephone handset via acoustic coupling or alternatively by being directly interfaced with the utilized transmitting medium. By utilizing such systems it is possible to transmit information at a rate ranging upwardly from one to approximately three or four documents per minute. Accordingly, in such systems the ability to efficiently and quickly convert the graphic information into video signals in the transmit mode and the corresponding ability to convert the video signals into graphic information in the receive mode becomes the limiting factor rather than shortcomings of the transmitting and receiving facilities.

SUMMARY OF THE INVENTION

Accordingly, it is an object of the present invention to improve facsimile transceivers.

It is another object of the present invention to provide facsimile transceiver apparatus having a high data throughput capability.

It is still another object of the present invention to provide improved facsimile transceiver apparatus which is highly reliable in operation and capable of operating over a dial telephone network.

It is yet a further object of the present invention to provide facsimile transceiver apparatus which is easy and simple to operate and which requires only casual operator attention.

It is yet a further object of the present invention to provide automated facsimile transceiver apparatus capable of transmitting graphic information over switched telephone lines at a high data throughput rate at an attendantly low unit cost.

It is still a further object of the present invention to provide automated facsimile transceiver apparatus utilizing electrographic recording processes to produce output copy of graphic information with high image resolution at an efficient and reliable high data throughput rate.

These and other objects of the invention are attained by means of a facsimile transceiver apparatus adapted for use in a facsimile system to convert information on record media into electrical signals for transmission to a remote location in a transmit mode and to convert electrical signals received from a remote location into representative information on record media in a receive mode.

A first media support member having a convex semicylindrical surface extending axially therealong and a second media support member having a concave semicylindrical surface extending axially therealong, cooperate when in the operative position to form a curvilinear passageway through which record media are advanced. Information is scanned and recorded on the respective record media at a scanning station axially located along the curvilinear passageway. A support member having optical scanning means and electrographic recording means operatively associated therewith is rotatable about the longitudinal axis of the passageway at the scanning station to scan and record the information.

In the transmit mode, a document containing information to be transmitted is advanced into the passageway by an automatic document transport system and upon rotation of the support member, electrical signals representative of the information are generated for transmission as the optical scanning means traverses the document.

In the receive mode, a copy sheet onto which information is to be recorded is advanced into the passageway by an automatic copy sheet transport system and upon rotation of the support member, electrostatic charge patterns are produced on the copy sheet in response to received electrical signals as the electrographic recording means traverses the copy sheet. The charge patterns of information on the copy sheet are rendered visible by means of an electrostatic powder developing apparatus which uniformly deposits a quantity of powder marking particles onto the surface of the electrostatically charged copy sheet. The developed image is then fused to the surface of the record media to provide a permanent facsimile copy of the received information.

Other objects of the invention will become readily apparent to those skilled in the art in view of the following detailed disclosure and description thereof, especially when read in conjunction with the accompanying drawings.

BRIEF DESCRIPTION OF THE DRAWINGS

FIGS. 15—16 are block diagrams illustrating the operation of the transceiver apparatus.

DESCRIPTION OF THE PREFERRED EMBODIMENTS

Figure 1:
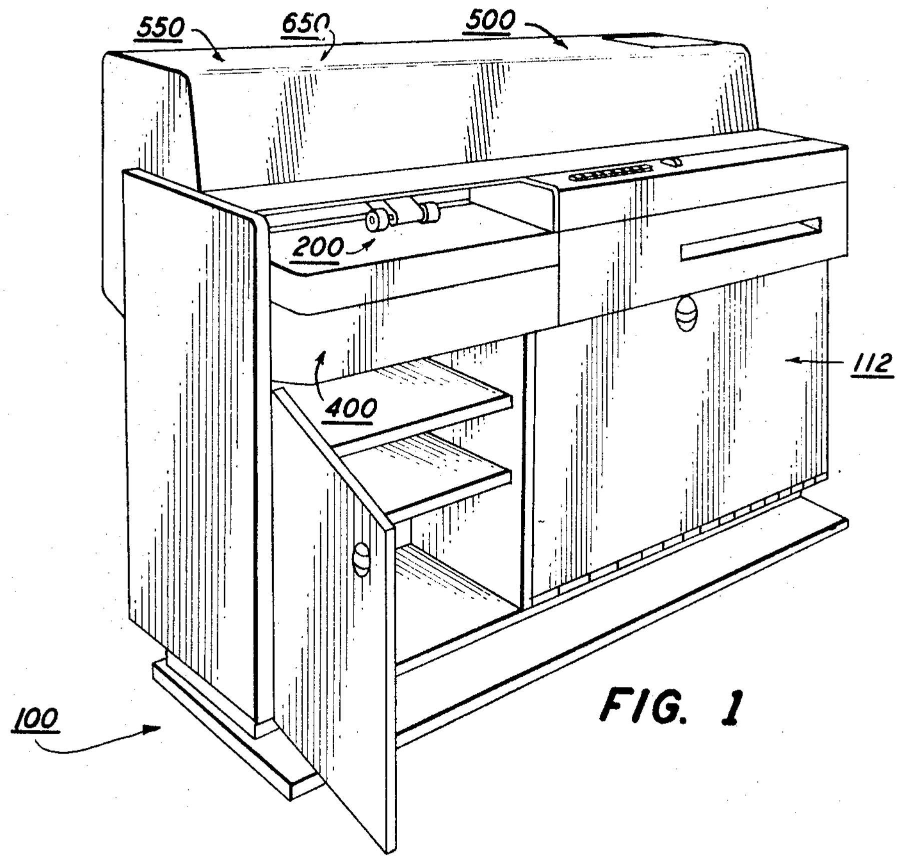
FIG. 1 is a perspective view of a cabinet in which the transceiver apparatus may be supported.
Figure 2:
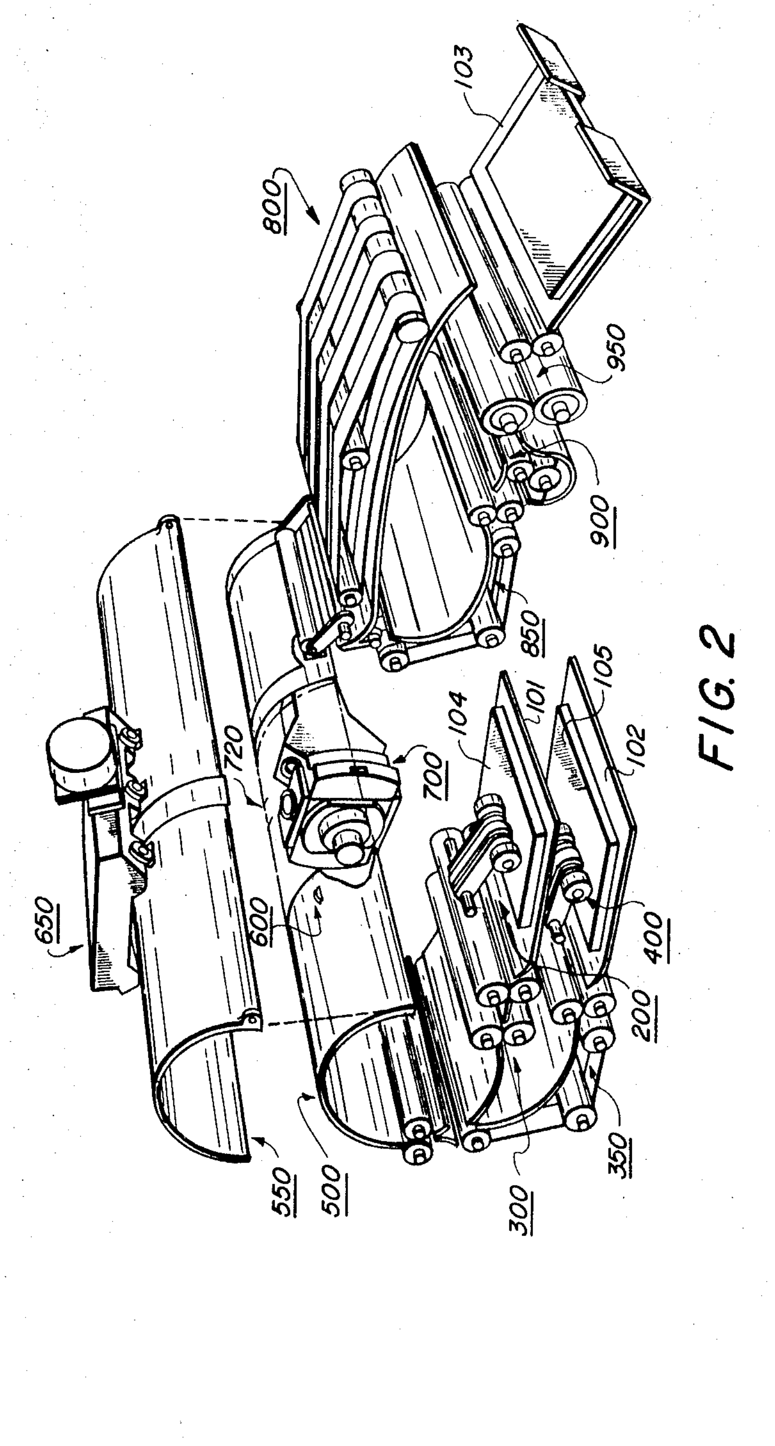
FIG. 2 is a schematic perspective view showing the various mechanical subassemblies of the transceiver apparatus.

Reference may be had to the schematic illustration of FIG. 2 for a general understanding of the operation of the facsimile transceiver apparatus as contemplated by the present invention. The various electrical components and mechanical subassemblies comprising the facsimile transceiver apparatus may be operatively situated in a cabinet enclosure 100 such as that illustrated in FIG. 1. The major electrical components 112 of the facsimile transceiver apparatus including the transceiver control logic, power supplies, and electronics may be suitably located in a compartment such as 111 in the cabinet 100 below the various mechanical subassemblies.

The facsimile transceiver according to the present invention is of the type designed to operate in the half duplex mode. That is, although the transceiver unit is designed to function both as a transmitter and a receiver, the transmitter and receiver are not capable of simultaneous operation. This arrangement therefore provides a maximum versatility in the transceiver with a minimum of duplication of electrical and mechanical components.

As may be seen from FIG. 2, an inner platen assembly generally designated 500 having an outer convex surface of generally semicylindrical configuration extends transversely within the transceiver s cabinet 100. An outer platen assembly generally designated 550 having an inner concave surface of generally semicylindrical configuration cooperates with the convex outer surface of inner platen assembly 500 to form a curved guide and passageway within which copy sheets and documents are supported and advanced in both the transmit and receive modes of the transceiver.

Documents 104 having information thereon which is to be transmitted by the transceiver to a remote location, are placed on a document support tray 101 at the front portion of the machine. These documents 104 are advanced by an automatic document feeder generally designated 200 and a document transport system generally designated 300 into the passageway defined by inner platen assembly 500 and outer platen assembly 550. Upon receipt of the proper control signals, a document 104 within the passageway is advanced axially therealong by a first paper drive mechanism generally designated 600 to a scanning station 720. When a document reaches the scan position, the paper drive assembly 600 is removed from engagement with the subject document and a stepping drive generally designated 650, upon receipt of appropriate control signals is engaged to control advancement of the subject copy through the scan area.

The document in the scan area is scanned by a rotating turret assembly 700 which projects a beam of light onto the subject copy. The projected light is reflected from a subject copy in a pattern corresponding to the information contained thereon and is collected and projected onto a photosensitive device within the rotating turret assembly. This pattern of information is thus converted to electrical information which in turn is transmitted to the electronic portion 112 of the machine for compression and storage prior to transmission to the remote location. Stepping drive 650 is intermittently actuated to advance a subject copy past the scan area in response to signals received from the storage circuitry in the electronic portion 112.

Upon completion of the scanning process, a subject copy 104 is then advanced to the end of the passageway by stepping drive 650 at an accelerated rate in position to be withdrawn therefrom by a document output transport generally designated 800. From document output transport 800, a subject copy 104 is deposited onto a document receiving member 103 at the front portion of the machine.

Copy sheets 105, onto which information is to be recorded when the transceiver is operated in the receive mode, are placed into the machine on a copy support tray 102 located at the front of the machine directly beneath the document support tray 101. Copy sheets 105 are advanced from the support tray 102 by means of an automatic copy feeder generally designated 400 and are transported into the passageway defined between inner platen assembly 500 and outer platen assembly 550 by means of a copy transport generally designated 350. When in position within the passageway, a copy sheet 105 is then advanced to the scan area 720 by the paper drive assembly 600 in a similar manner to that in which a document is advanced. When in a scanning position, and upon receipt of suitable control signals the paper drive 600 is removed from engagement with a copy sheet and the stepping drive engaged therewith.

Information is recorded upon a copy sheet 105 by means of an electrographic recording process. An electrographic stylus is supported on the rotating turret assembly generally designated 700 and rotates therewith as does the scanning apparatus which is used to scan information on documents. When in the receive mode electrical information received in the electronic portion of the machine is decoded and utilized to activate the electrographic recording stylus in the turret assembly. In response to the received information, the subject copy sheet is electrographically charged in patterns corresponding to the information contained on a document at the transmitting location. Upon completion of the recording process, the copy sheet is advanced by the stepping drive assembly 650 at an accelerated rate to the end of the passageway in position to be removed therefrom.

The copy sheet 105, having latent electrostatic charge patterns is removed from the passageway by a second output assembly generally designated 850 and advanced to a developing apparatus generally designated 900 where the charged pattern on the copy sheet is rendered visible by depositing electrographic powder particles thereon which are attracted to the copy sheet in the charged areas. From the developer area, the copy sheet is advanced to a fusing station generally designated 950 at which the electrographic powder particles are fused to form a permanent facsimile copy of the information contained on a document at the transmitting location. From the fuser station 950 the copy sheet 105 is advanced to the copy receiving member 103 located at the front portion of the machine.

With reference to FIGS. 3—8, the supporting structure for the facsimile apparatus according to the present invention includes a lower frame base member 106 which extends transversely within the cabinet 100 and suitably supported therein. A pair of upstanding end support members 107 and 108 are connected to lower frame base member 106 at either end thereof by bolts or other suitable fastening means. An upper frame base member 109 is connected to the upper ends of end support members 107 and 108 and extends transversely therebetween. A center upstanding support member 110 is mounted intermediate between support members 107 and 108 and is connected between upper frame base member 109 and lower frame base member 106 for added support therebetween.

An inner platen assembly generally designated 500 having a convex generally semicylindrical surface and an outer platen assembly generally designated 550 having a concave generally semicylindrical surface combine when in the operative position to form a curvilinear passageway of generally semicircular cross section through which documents and record sheets are advanced. A scanning station generally designated 720 at which information is scanned on original documents when operated in the transmit mode and information is recorded onto copy sheets when operated in the receive mode is axially positioned along the passageway defined by inner platen 500 and outer platen 550.

Inner platen assembly 500 includes a first arcuately shaped support member 501 having a generally semicircular cross section with a pair of support flanges 509 and 510 thereon, and a second arcuately shaped support member 502 having a generally semicircular cross section with a pair of support flanges 507 and 508 thereon. Support members 501 and 502 are mounted on upper frame base member 109 via bolts or other suitable fastening means through support flanges 507—510. Support members 501 and 502 are spaced from each other at the inner ends thereof on upper frame base member 109 to provide a space therebetween to facilitate scanning and recording at the scanning station 720.

A first pair of idler rollers 503 and 505 are rotatably supported by support member 502 adjacent scanning station 720. Idler rollers 503 and 505 are angularly spaced from each other and project through apertures in support member 502 beyond the outer surface thereof. A second set of idler rollers 504 and 506 similar to idler rollers 503 and 505 are spaced axially along support member 502 from idler rollers 503 and 505. Idler rollers 504 and 506 are similarly rotatably mounted from the inner side of support member 502 and project through apertures therein to slightly above the outer surface of support member 502. Idler rollers 504 and 506 are angularly aligned with idler rollers 503 and 505 and will be further described in connection with the paper driving apparatus 650 referred to hereinafter.

Outer platen assembly designated 550 includes a first arcuately curved member 551 having a generally semicircular cross section and a second arcuately curved member 552 having a similarly generally semicircular cross section. A backing member 558 having an inner concave surface which conforms to the generally semicircular cross section of members 551 and 552 is positioned therebetween to overlie the space between support members 501 and 502 at the scanning station 720 when outer platen assembly 550 is in the closed or operative position. Backing member 558 serves to provide a smooth uniform surface on which record media are supported at the scanning station and is held at ground potential during the recording process. Support members 551 and 552 with b8cking member 558 therebetween are rigidly connected to form a unitary outer platen assembly via a plurality of axially extending rods 555 connected through end mounting plates 553 and 554 and flanges 556 in arcuate members 551 and 552. Outer platen assembly 550 is pivotally mounted on the support frame structure via pivot pins 557 through end mounting plates 553 and 554 and upper frame base 109. Outer platen assembly 550 when in the closed position is supported at the side opposite pivot pins 557 by means of support pads 559 connected to upper frame base 109 which engage V-notches 560 in end plates 553 and 554. From this arrangement it thus may be seen that when outer platen assembly 550 is in the closed position there is provided a passageway having a generally semicircular cross section within which documents and copy sheets are supported during the scanning and recording processes.

As may be seen in from FIGS. 2—6, a high speed input drive apparatus generally designated 600 and an output and stepping drive apparatus generally designated 650 which are the subject of copending application Ser. No. D–1785 filed concurrently herewith in the name of Frank Headd and assigned to the same assignee as the instant application, cooperate to transport a document or copy sheet axially along the passageway defined between inner platen assembly 500 and outer platen assembly 550. A wheel support frame 607 is pivotally connected to upper frame base 109 via support bracket 614 and pivot shaft 615. A pair of idler roller members 687 and 688 are rotatably mounted on stub shafts connected to one end of wheel support frame 607 adjacent the input side of scanning zone 720. Idler rollers 687 and 688 are angularly spaced from each other and project through suitable apertures in inner support member 501 to align with idler roller members 503—506, previously described. At the opposite end of wheel support frame 607 are mounted a pair of friction drive wheels 612 and 613. Drive wheels 612 and 613 are rotatably mounted in wheel support frame 607 via stub shafts 610 and 611. Friction drive wheels 612 and 613 are preferably formed from a material having a high coefficient of friction and are adapted upon pivotable movement of wheel support frame 607 to project into the passageway defined between inner platen assembly 500 and outer platen assembly 550 via suitable apertures in inner platen 501.

Friction drive wheels 612 and 613 may be driven by means of a motor MOT–600 connected to upper frame base member 109 via mounting bracket 621. Motor MOT–600 may include a suitable reduction drive therein to provide the desired speed of rotation at output shaft 601. A stub shaft 605 is rotatably mounted in wheel support frame 607 and has connected thereto a helical drive gear 606. Drive gear 606 meshes with a pair of helical gears 608 and 609 connected to stub shafts 610 and 611 respectively. Stub shaft 605 is connected to the output shaft 601 of motor MOT–600 via a pair of flexible drive couplings 602 and 604 and an intermediate stub shaft 603.

A rotary solenoid SOL–600 is connected to upper frame base member 109 via mounting bracket 616. Rotary solenoid SOL–600 includes a lever arm 620 which extends therefrom and is engageable with a pin 617 projecting from wheel support frame 607. A spring member 618 is connected to a projecting pin 617 at one end thereof and at the other end is connected to a bracket 619 mounted on upper frame base 109, thus normally biasing wheel support frame 607 in the counterclockwise direction as viewed in FIG. 3. In this position, idler rollers 687 and 688 are pivoted to project into the passageway defined between inner platen assembly 500 and outer platen assembly 550 whereas friction drive wheels 612 and 613 are retracted from the passageway.

Output and stepping drive assembly generally designated 650 includes a frame member 651 rigidly connected to outer platen assembly 550. A plurality of friction drive rollers 652—657 are rotatably mounted in frame member 651 via drive shafts 658—663 respectively. Friction drive wheels 652—657 are axially and angularly positioned with respect to outer platen assembly 550 to align with the previously described idler roller members 503—506 and 687—688. That is, when the outer platen assembly 550 is in the closed position as shown in FIGS. 3—8, friction drive wheel 655 is engaged with idler roller 504, friction drive wheel 652 is engaged with idler roller 505, friction drive wheel 56 is engaged with idler roller 503, friction drive wheel 653 is engaged with idler roller 505, friction drive wheel 657 is engaged with idler roller 687 and friction drive wheel 654 is engaged with idler roller 688.

A plurality of bevel gears 676, 673, 667, 675, 671, and 668 are connected to stub shaft 658, 659, 660, 661, 662, and 663 respectively to provide rotative movement to the respective friction drive wheels 652—657 connected thereto. A first drive shaft 664 is rotatably mounted in frame member 651 and includes a plurality of bevel gears 666, 669, 670 and 672 spaced axially therealong to engage the respective gears on stub shafts 663, 660, 662, and 659. Drive shaft 664 is driven via motor MOT–602 and spur gears 681 and 680. A second drive shaft 665 is rotatably mounted in frame member 651 and has connected thereto a pair of bevel gears 674 and 677 which provide rotative movement to friction drive wheels 655 and 652 via shafts 661 and 658 respectively. Drive shaft 664 and 665 are interconnected via a flexible coupling 682 and a pair of one way overriding clutch assemblies 683 and 684 which are of a type generally well-known. A spur gear 685 connected to the one way overriding clutch assembly 684 meshes with a second spur gear 686 connected to the output shaft of motor MORT–601. From this arrangement MOT–601 may be effectively utilized to drive shaft 665 at a higher angular velocity than that which drive shaft 664 is being driven under the influence of motor MOT–602.

Thus, it may be seen that with a document in proper position within the passageway defined between inner platen assembly 500 and outer platen assembly 550, the document is first advanced at a high rate of speed to the scanning station 720 under the influence of the high speed input drive 600, then intermittently stepped or advanced past the scanning station 720 under the influence of the stepping drive 650, and after clear of the scanning station 720 advanced at a high continuous rate of speed to the end of the passageway under the influence of drive wheels 652 and 655.

The advancement of both documents and copy sheets through the passageway is initiated in response to appropriate signals from the control logic of the machine. Upon receipt of such signals, solenoid–600 is activated to rotate lever arm 620 whereby to engage projection pin 617 connected to wheel support frame 607. This pivots wheel support frame 607 and friction drive wheels 612 and 613 rotatably connected thereto against the bias of spring 618 whereby the document within the passageway is frictionally engaged by the friction drive wheels 612 and 613. As motor MOT–600 is energized, drive wheels 612 and 613 are driven at a high rate of speed to advance the engaged document over retracted idler rollers 687 and 688 to scanning station 720.

The leading edge of record media approaching the scanning zone is detected by a pair of photosensors such as photodiodes PC–600 in backing member 558 and associated light sources LMP–600 in support member 502, which after a suitable time delay produce a signal through the control logic to inactivate the high speed input drive 600 and activate stepping drive 650. Thus a suitable signal from the control logic of the machine deenergizes motor MOT–600 and solenoid SOL–600 thus retracting friction drive wheels 612 and 613 from engagement with the document within the passageway and pivoting idler roller members 687 and 688 into contact with the document therein under the influence of spring member 618. In this position the document is stepped or intermittently advanced axially within the passageway under the influence of the stepping drive assembly and motor MOT–602 which is activated in response to signals from the buffer storage circuitry. As the document is axially stepped through the scanning zone it ultimately becomes engaged between the bite of the subsequent pairs of friction drive wheels 653, 656, and 652, 655, and the respective idler rolls. After the trailing edge of the document clears photodiodes PC–600 and a suitable time delay, MOT–601 is activated to over drive the friction drive wheels 652 and 655 at a higher rate of speed than the rate under which they were driven by stepping motor MOT–602. Thus under the influence of friction drive wheels 652 and 655 the document is advanced axially along the passageway toward the end thereof in position for subsequent removal therefrom. This dual speed drive arrangement thus provides for the added flexibility of removing a document from the scanning zone after scanning has taken place independent of the action of the stepping drive assembly whereby it is possible to bring a second document into the scanning zone without the consequent loss of time in waiting for the first document to completely clear the drive mechanism.

In the preferred embodiment of the invention, the copy sheet feeding apparatus is preferably of the type disclosed in Eichorn, U.S. Pat. No. 3,137,495. As disclosed therein, a supply of record media in cut sheet form such as paper 105 to be fed one at a time to the sheet conveyor mechanism 350, is held on a paper tray 102 movably positioned at the front of the machine between frame plates 114 and 115 by means of a pair of conventional drawer slides 403 and 404. The copy paper tray 102 is positioned below the paper tray 101 for supporting documents which is also slidably mounted on a pair of conventional drawer slides so that either of these trays can be extended beyond the outer margins of the cabinet of the machine.

Figure 9:
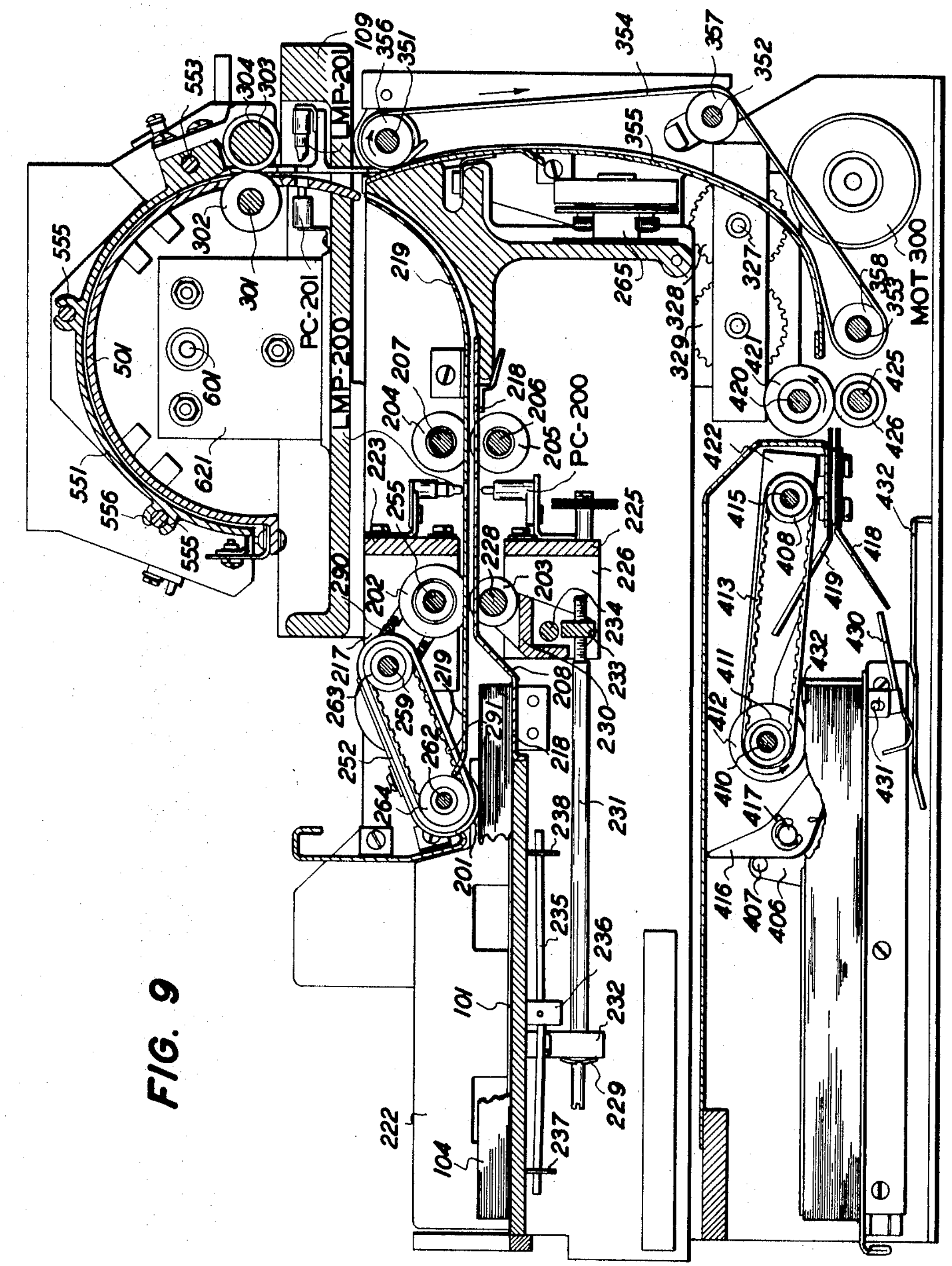
FIG. 9 is a cross-sectional view taken along the lines 9–9 of FIGS. 3 and 5.

The paper tray 102 includes a pair of adjustably positioned lateral guide members 427 and 428 for aligning the lateral edges of copy sheets in the stack and an adjustably positioned guide pin 429 for aligning the trailing edges of copy sheets in the stack. A forward guide plate 430, as shown in FIG. 9, is hinged about pin 431 at the front of the paper tray 102 to align the leading edges of copy sheets in the stack before insertion into the machine. A torsion spring positioned about pin 431 normally biases guide elate 430 to the upright position when the paper tray 102 is withdrawn from the machine.

In order to insure separation of the topmost sheet from the remainder of the stack of copy sheets on the tray there is provided a pair of corner separators positioned and secured to lateral guides 427 and 428 on opposite sides of the paper tray 102. Each corner separator includes a vertical front stop portion for aligning and restraining the leading edges of the sheets, and an inwardly extending lip portion adapted to rest upon the topmost sheet of the stack to act as a stripper as is well-known in the art. A spring extension strip portion interconnecting corner separators to lateral guides 427 and 428 normally biases the lip portion of the corner separators into contact with the uppermost sheet of the stack.

Figure 3:
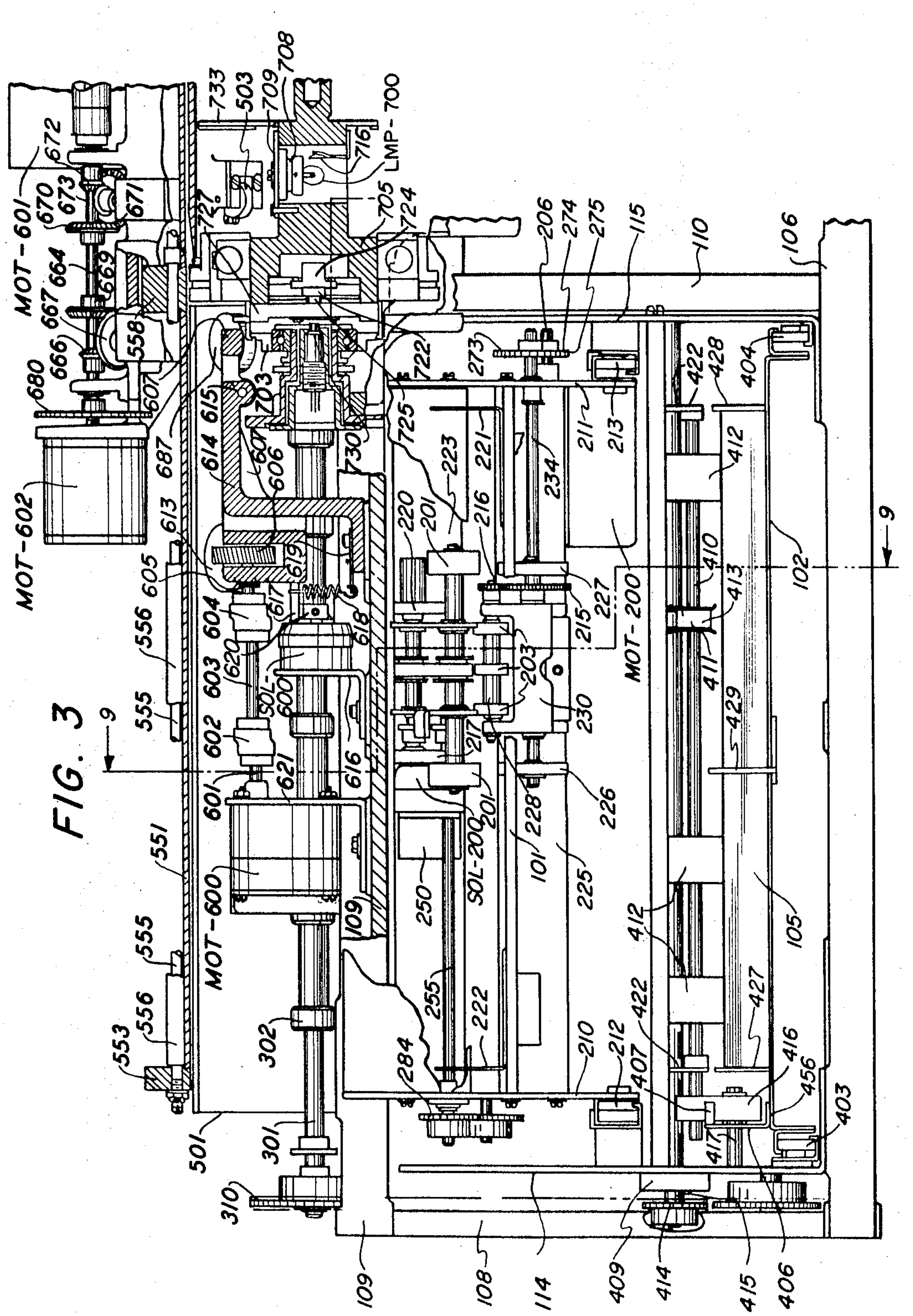
FIG. 3 is a partly broken away front elevation of the left-hand portion of the transceiver apparatus according to the present invention.

A stack of copy sheets 105 is thus placed onto paper tray 102 between lateral guides 427 and 428 with the corner separators positioned to rest on the uppermost sheet in the stack. The stack is then positioned with the leading edges thereof abutting against the upstanding guide plate 430 with guide pin 429 being positioned to abut against the trailing edges of the stack. As the paper tray is advanced to its normal operating position as shown in FIGS. 3 and 9, the lower depending portion of guide plate 430 contacts cam plate 432 to pivot guide plate 430 clockwise as viewed in FIG. 9 about pin 431 in opposition to the torsion spring bias. In this position guide plate 430 is pivoted out of the upstanding position to permit a single sheet to be advanced past corner separators 432 toward the copy conveyor mechanism 350.

Figure 8:
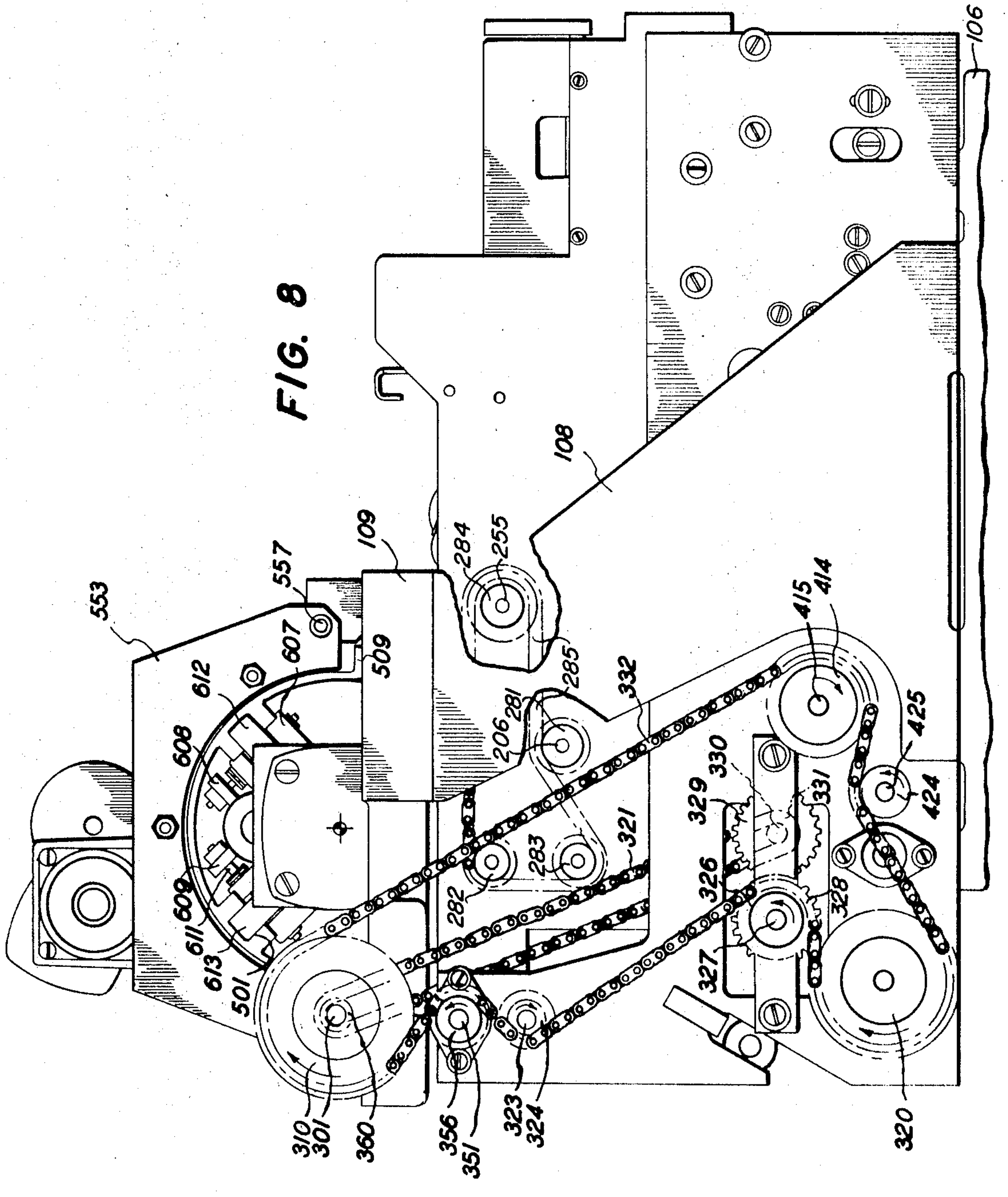
FIG. 8 is a left-hand elevation of the transceiver apparatus.

A shaft 415 is rotatably journaled in frame plates 114 and 115 and is driven by sprocket 414, as shown in FIG. 8, through electromagnetically actuated clutch assembly 409, as shown in FIG. 3, to rotate in the direction as shown in FIG. 9. A pair of elongated support plates 422 are rotatably mounted at one end thereof on drive shaft 415 by bushings or other suitable mounting means. A second shaft 410 is rotatably mounted in the other ends of support plates 422 by bushings or other suitable mounting means providing pivotal movement of shaft 410 about shaft 415. Shaft 410 is driven in the counterclockwise direction as viewed in FIG. 9 by means of a flexible drive such as timing belt 413 entrained about drive pulleys 408 and 411 connected to shafts 415 and 410 respectively.

A bellcrank lever arm 416 is pivotably supported on frame plate 114 by means of stub shaft 417. A torsion spring 408 engages bellcrank 416 providing a bias in the counterclockwise direction as viewed in FIG. 9. As bellcrank 416 is thus biased by torsion spring 408 with the paper tray withdrawn from operative position within the machine, one end of bellcrank lever 416 contacts an extended end of shaft 410 to pivot shaft 410 clockwise about shaft 415. A vertical support 406 connected to paper tray 102 has an extending pin projection 407 which is engageable with the other end of bellcrank 416 when the paper tray is in the operative position within the machine. As pin projection 407 contacts bellcrank 416, the bellcrank is pivoted clockwise about stub shaft 417 overcoming the bias of spring 408 to thereby pivot shaft 410 in the counterclockwise direction as viewed in FIG. 9.

A plurality of friction drive members 412 which are formed from a material such as rubber, having a high coefficient of friction are connected to shaft 410 by means of one way overriding clutch assemblies of a type which are well-known in the art. These one way clutch assemblies permit drive members 412 to be driven under the influence of shaft 410 but permit drive members 412 to overrun the driving force of shaft 410 as copy sheets are withdrawn from the stack under the influence of the conveyor mechanism 350 which will hereinafter be more fully described.

A shaft 425, forming a part of a pinch roll arrangement, is rotatably journaled between frame plates 114 and 115 and is continuously driven in the counterclockwise direction as viewed in FIG. 8 by sprocket 424 connected thereto. A plurality of friction drive rollers 426 of a type having a high coefficient of friction are connected to shaft 425 and are axially spaced therealong. A second shaft 420 having a plurality of idler rollers 421 spaced axially therealong is rotatably mounted between frame plates 114 and 115 with the idler rollers 421 engaging the friction drive rollers 426 on shaft 425. A pair of plate members 418 and 419 extend between frame plates 114 and 115 to form a throat or passageway for copy sheets between paper support tray 102 and the pinch roll arrangement formed by friction drive rolls 426 and idler rolls 421.

A curved plate member 355 having a generally convex surface thereon extends from the exit side of pinch rollers 421 and 426 upwardly to a lower depending portion of inner support member 501. The convex surface of plate member 355 forms a portion of the copy transport apparatus 350 and serves as a guide over which copy sheets 105 are advanced.

A drive shaft 351 having a plurality of pulley members 356 connected thereto and axially positioned therealong is rotatably journaled between frame plates 114 and 115 adjacent the upper end of curved guide plate 355. Drive shaft 351 is driven in the counterclockwise direction as seen in FIG. 8 by drive sprocket 356 connected thereto. An idler shaft 353, as viewed in FIG. 9, having a plurality of pulley members 358 connected thereto and axially positioned therealong to align with the pulley members 356 on drive shaft 351 is rotatably journaled between frame plates 114 and 115 adjacent the lower end of curved guide plate 355. A plurality of endless belt members 354 are entrained about drive shaft 351 and idler shaft 353 on the respective pulley members 356 and 358 to provide a moving surface for advancing copy sheets over the convex surface of plate member 355. A second idler shaft 352 having a plurality of pulley members 357 connected thereto and axially positioned to align with the pulley members 356 and 358 on shafts 351 and 353 respectively is rotatably journaled between frame plates 114 and 115 and resiliently biased into engagement with belt members 354, forming a resilient wrap of belt members 354 over the convex surface of guide plate 355. Thus as endless belt members 354 are driven by drive shaft 351 about the idler shafts 352 and 353 and over the surface of guide plate 355, a copy sheet inserted therebetween will be advanced upwardly toward the passageway defined between inner and outer platen assemblies 500 and 550 respectively.

A drive shaft 301 is rotatably journaled on upper frame base 109 adjacent the inner surface of inner support member 501 as shown in FIG. 9. Shaft 301 extends axially along support member 501 and includes a plurality of friction drive members 302 axially positioned along shaft 301 which project through suitably arranged apertures in inner support member 501 to within the passageway formed by inner platen assembly 500 and outer platen assembly 550. Friction drive members 302 are positively connected to shaft 301 to be driven thereby when shaft 301 is rotated.

A first drive sprocket 360, as shown in FIG. 8, is positively connected to shaft 301 to rotate shaft 301 at a first predetermined angular velocity when the transceiver apparatus is operated in the receive mode. A second drive sprocket 310 is connected to shaft 301 by means of a one way overriding clutch assembly of a type which are generally well known, to rotate shaft 301 at a second predetermined angular velocity when the transceiver apparatus is operated in the transmit mode. The one way overriding clutch assembly thus permits shaft 301 to be rotated at a higher angular velocity in the receive mode under the influence of drive sprocket 360 than that in the transmit mode.

An idler shaft 303, as viewed in FIG. 9, having a plurality of idler rolls 304 axially positioned therealong in alignment with the friction drive members 302 on shaft 301 is rotatably journaled on outer platen assembly 550. Idler rolls 304 engage friction drive members 302 when outer platen assembly 550 is in the operative position to provide a pinch roll arrangement for driving copy sheets and original documents into proper position on inner support member 501.

Power for operating the copy feed apparatus 400, the copy transport apparatus 350 and the pinch roll arrangement for driving documents and copy sheets into proper position onto support member 501 is provided by means of a synchronous motor MOT–300 connected to frame plate 114. A drive sprocket 320, as seen in FIG. 8, connected to the output shaft of motor MOT–300 which projects through frame plate 114 rotates sprocket 320 in the clockwise direction as viewed in FIG. 8. As may be seen from FIG. 8, an endless drive chain 332 is entrained about sprocket 320 and passes over sprocket 326 to idler sprocket 324 rotatably mounted on stub shaft 323, then to drive sprocket 356 connected to shaft 351, then to drive sprocket 310 connected to shaft 301 via the one way overriding clutch assembly, and then to drive sprocket 414 connected to shaft 415 by means of the electromagnetically actuated clutch member 409 as previously described. Sprocket 326 is connected to one end of shaft 327 by means of an electromagnetically actuated clutch member also of a type which are well-known in the art. At the other end of shaft 327 is connected a spur gear 328 which is positively driven upon actuation of the electromagnetic clutch assembly. Spur gear 328 meshes with a second spur gear 329 connected to one end of shaft 330. A drive sprocket 331 is positively connected to the other end of shaft 330 and an endless flexible drive chain 321 is entrained about sprocket 331 which also passes over sprocket 360 connected to shaft 301.

In the preferred embodiment of the invention the document feeding apparatus is preferably of the type disclosed in copending application Ser. No. 711,547 filed Mar. 8, 1967 in the names of Richard E. Smith, Paul S. Heiler, and Franklin L. Headd and assigned to the same assignee as the instant invention. As disclosed therein, a quantity of documents 104 are supported in stacked relationship on a support tray 101 to be fed one at a time or in serial fashion into the transceiver apparatus for scanning by the scanning apparatus 700 to be subsequently described. The document feeder apparatus is preferably constructed in modular form to easily slide into and out of the transceiver apparatus. The module comprises a pair of frame plates 210 and 211 which are connected in spaced relationship to support tray 101. The module unit is supported by means of a pair of conventional drawer slides 212 and 213 interconnecting frame plates 114 and 210 and 115 and 211 respectively. The document feeder apparatus is thus adapted to slide on drawer slides 212 and 213 into an operative position within the transceiver apparatus. The sliding arrangement provides easy access to the feeder apparatus as well as other components of the transceiver. An electrical connector 265 located at the rear of the sheet feeder apparatus is adapted to mate with a compatible connector in the transceiver apparatus when in the operative position. Connector 265 thus provides the module with the necessary enabling electrical signals including those from the transceiver logic circuitry.

A quantity of documents to be fed into the transceiver apparatus are supported on the document support tray 101. A pair of margin guards 221 and 222 are slidably connected to document support tray 101 through laterally extending slots 224 in document support tray 101 to permit lateral adjustment thereof. Margin guards 221 and 222 are supported on the surface of document support tray 101 by means of brackets 237 and 238 which extend through the slots 224. The guards are held in place by means of tension bars 235 rigidly connected at either end to brackets 237 and 238. A roller member 236, the radius of which is greater than the distance between the bar 235 and the lower surface of document support tray 101, is rotatably journaled on bar members 235 to provide a biasing force for supporting the guards in a fixed position. The forces thus exerted by the spring action of the bar members 235 provide means for releasably holding the margin guards at particular lateral positions in relation to the document feeding apparatus which will be subsequently described.

A drive shaft 206 is rotatably journaled at the ends thereof between frame plates 210 and 211. A plurality of document feed rollers 205 are rigidly connected to drive shaft 206 in axially spaced relationship therealong for advancing separated documents into engagement with the platen feed rollers 302 and 304. An idler shaft 207 is rotatably journaled at the ends thereof between frame plates 210 and 211 and includes a plurality of idler rollers 204 supported thereon and adapted to engage the document feed rollers 205 on shaft 206. Shaft 207 and rollers 204 supported thereon are normally biased toward shaft 206 by gravitational forces, shaft 207 being freely displaceable in the vertical direction via slots in frame plates 210 and 211.

A first plate member 218 as seen in FIG. 9, including abutment 208 extends from document support tray 101 past drive rollers 205 and upwardly into communication with the passageway defined between inner platen assembly 500 and outer platen assembly 550. A second plate member 219 extends from above document support tray 101 in the direction of plate member 218 into communication with the passageway defined between inner platen assembly 500 and outer platen assembly 550. Plate members 218 and 219 thus define a path of travel toward the platen assemblies and include suitably arranged apertures to admit roller members 204 and 205 therein, in addition to roller members 202 and 203 to be subsequently described. The arrangement of plate members 218 and 219 therefore provides a guide through which documents are advanced toward the platen assemblies.

A separator support plate 223 is connected laterally between frame plates 210 and 211 and includes a pair of longitudinally extending support plates 217 and 220 connected thereto. A drive shaft 255 is rotatably journaled at one end in support plate 220 and at the other end thereof in frame plate 210, the shaft 255 being intermediately journaled in support plate 217. A pair of sheet separating and advancing rollers 202 are rigidly connected to shaft 255, for separating and advancing the uppermost sheet in the stack on support tray 101 in a manner which will hereinafter be more fully explained.

A shaft 259 is rotatably journaled between support plates 217 and 220 and is driven as shaft 255 is driven by means of an endless flexible drive chain 290 entrained about drive sprockets 260 and 261 connected to shafts 255 and 259 respectively. A pivotable carriage frame 252 is rotatably journaled at one end about shaft 259 and at the other end supports a shaft 262 rotatably journaled therein. Shaft 262 at either end has connected thereto a separating and advancing roller member 201, the roller members 201 being spaced outwardly from carriage frame 252.

Shaft 262 is driven as shaft 259 is driven by means of an endless flexible chain belt entrained about pulleys 263 and 264 connected to shafts 259 and 262 respectively.

A sleeve member 258 is rotatably journaled on shaft 259 and extends through support plate 220. Sleeve member 258 is rigidly connected at one end to carriage frame 252 to pivot therewith and at the other end has connected thereto a weighted member 253 via arm 257. Weighted member 253 is thus eccentrically mounted on sleeve member 258 to provide a counterbalancing force in opposition to the normal force exerted by the carriage frame 252 against a stack of documents. Lever arm 257 is releasably connected to sleeve member 258 by setscrews or other suitable fastening means to adjustably position weight 253 about the axis of shaft 259 whereby to vary the gravity vector of the counterbalance and hence change the pressure exerted on the stack of sheets.

A rotary solenoid SOL–200 is supported on a mounting bracket 250 connected to support plate 223. A lever arm 251 connected to the armature of solenoid SOL–200 is engageable with projection 254 on carriage frame 252 to pivot carriage frame 252 about shaft 259 to a raised position.

A plate member 225 is transversely connected between frame plates 210 and 211 below plate 218 and has connected thereto a pair of longitudinal plates 226 and 227 which extend toward abutment 208. A support member 230 is pivotally supported between longitudinal plates 226 and 227 on rotatable drive shaft 234. Shaft 234 extends to the right as viewed in FIG. 3 through frame plate 211 and will be further referred to in connection with the drive train for the document feeder apparatus. A shaft 228 is rotatably journaled in support member 230 at the upper portion thereof. A plurality of roller members 203 are rigidly connected to shaft 228 in axial spaced relationship on the opposite side of the passageway from roller members 202. The axial spacing of roller members 203 is staggered with respect to the spacing of roller members 202 to provide an interlaced roller arrangement.

A threaded swivel member 233 is pivotally attached to the lower portion of support member 230 to receive the threaded end of an adjusting shaft 231. Shaft 231 at the other end is rotatably journaled in a support bracket 232 and held against axial movement in the one direction by means of a collar 229 connected to shaft 231. Shaft 231, thus provides a means for varying the extent to which roller members 203 interlace with roller members 202.

The drive shaft 234 as previously described is journaled at one end through frame plate 211 and has connected thereto a drive sprocket 273. Shaft 234 at the other end is journaled through support plates 226 and 227 and has connected thereto a spur gear 215 intermediate plate 227 and support member 230. Spur gear 215 meshes with a spur gear 216 connected to shaft 228 for driving roller members 203.

Power for the feeder apparatus is supplied by a motor MOT–200 connected to frame plate 211 by bolts or other suitable mounting means. An endless flexible drive chain is entrained about drive sprocket 271 connected to the output shaft of motor MOT–200, drive sprocket 273 on shaft 234, and drive sprocket 274 connected to an electromagnetically actuated clutch assembly 280 on shaft 206. Clutch 280 is similar to those used elsewhere herein and is of a type which are generally well known. Drive chain 275 passes over an idler sprocket 272 adjustably supported on frame plate 211 which facilitates proper tensioning of the drive chain 275.

When the transceiver apparatus is operated in the transmit mode, motor MOT–200 will be continuously energized to provide power to the various components of the feeder apparatus. As may be seen from FIGS. 9 and 10, shaft 228 with roller members connected thereto will be continuously driven in a counterclockwise direction by the drive arrangement from flexible chain drive 275 to sprocket 273 on shaft 234 and the gear arrangement 245 and 246 connected to shafts 234 and 228 respectively. Drive to the remaining components of the feeder apparatus is intermittently controlled by means of the electromagnetic clutch assembly 280 on shaft 206.

Upon receipt of a suitable signal from the control logic of the transceiver apparatus, shaft 206 is engaged with the drive from motor MOT–200 through clutch 280 to rotate shaft 206 and roller members 205 connected thereto in a clockwise direction. When roller members 205 are thus driven, shaft 207 through roller members 204 connected thereto and roller members 205 connected to shaft 206, will be driven in a counterclockwise direction.

Upon rotation of shaft 206, flexible drive chain 285 will be driven about the respective sprocket members 282, 283, and 284 via sprocket member 281 connected to shaft 206. As flexible chain drive 285 is thus driven, sprocket 284 will be driven in a counterclockwise direction rotating shaft 255, sprocket 260, and roller members 202 in a counterclockwise direction. As sprocket 260 is thus driven, sprocket member 261 will be driven in a counterclockwise direction via flexible chain drive 290 to rotate pulley member 263 on shaft 259 in a counterclockwise direction. As pulley member 263 is thus rotated shaft 262 with roller members 201 connected thereto will be driven in a counterclockwise direction via flexible belt member 291.

When in the operating condition, rotary solenoid SOL–200 of the feeder apparatus will be normally energized rotating lever arm 251 into engagement with projection 254 on carriage frame 252 thereby pivoting carriage frame 252 to the raised position. In this position, documents 104 are easily inserted onto the surface of document support tray 101 from which they will be subsequently separated and advanced. With the carriage frame 252 in the raised position, the sheet feeder apparatus is in a standby condition awaiting an appropriate activating signal from the control logic of the transceiver apparatus to initiate the feeding of a single sheet onto the platen assembly. In the standby condition, electromagnetic clutch member 280 is deenergized through a suitable control signal from the control logic of the transceiver apparatus thereby interrupting the drive train to shaft 206 and hence roller members 205, 204, 202 and 201.

Figure 10:
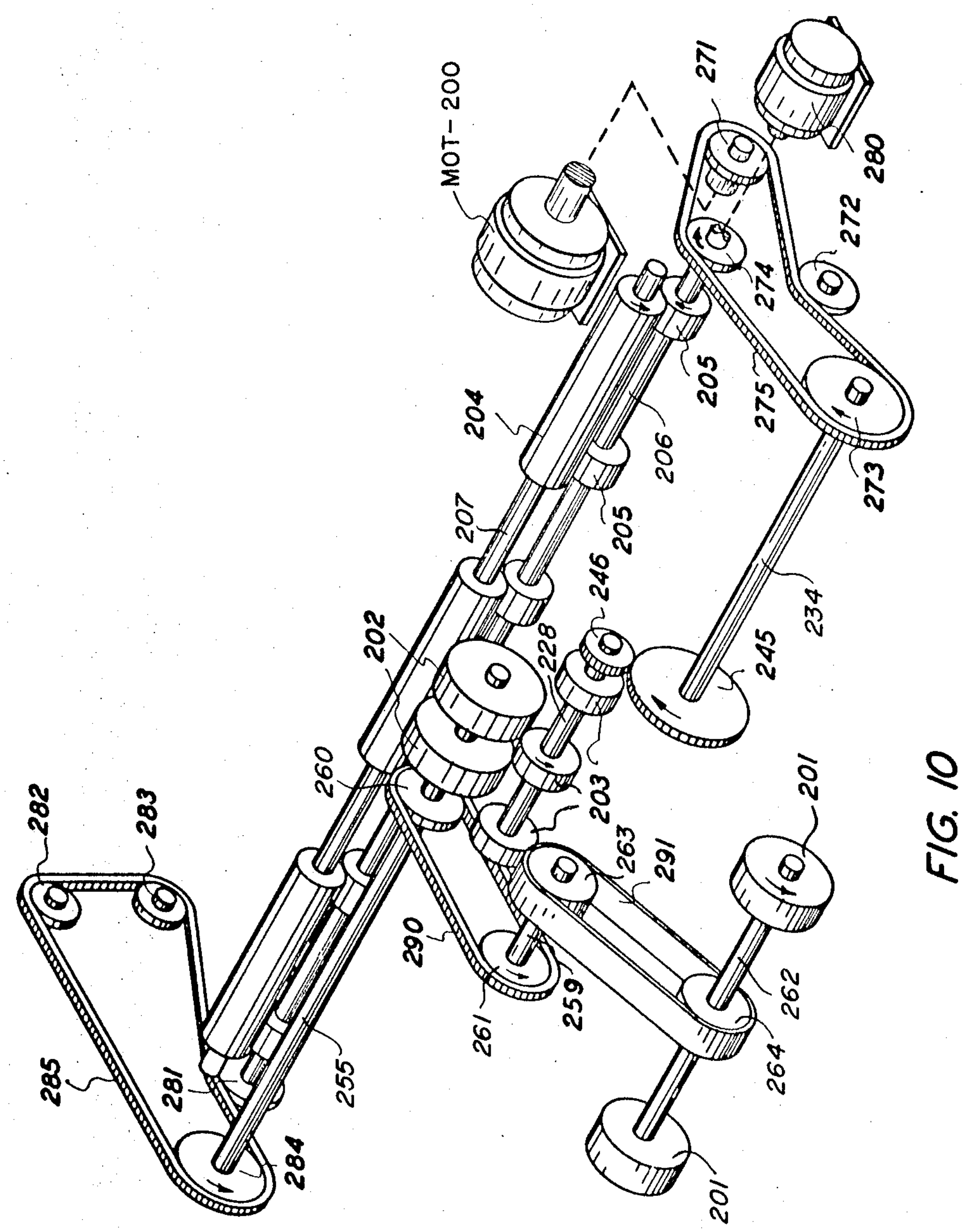
FIG. 10 is a schematic perspective view illustrating the automatic document feeding apparatus of the present invention.

Upon receipt of an activating pulse from the transceiver control logic, electromagnetic clutch 280 will be energized, engaging the drive train to shaft 206 thereby rotating roller members 205 in the clockwise direction as viewed in FIGS. 9 and 10, and the roller members 204 in the counterclockwise direction. At the same instant, rotary solenoid SOL–200 is deenergized removing lever arm 251 from engagement with projection 254 on carriage frame 252 thereby permitting carriage frame 252 to pivot toward the uppermost sheet in the stack of documents on support tray 101. Roller members 201 are thus brought into contact with the uppermost sheet in a stack as the weight of carriage frame 252 overcomes the force exerted by counterbalance 253. In this position, the rotating roller members 201 advance at least the uppermost sheet in the stack toward abutment member 208. In addition, several of the successively adjacent sheets at the upper portion of the stack may be advanced toward abutment member 208. In such case, the combination of the frictional characteristics associated with successively adjacent sheets and the effect of abutment member 208 tends to shingle or fan the sheets in the stack as they are advanced toward roller members 202 and 203. This shingling effect thus imparts an initial separation of the sheets before contacting the roller members 202 and 203.

Thus, a plurality of the sheets 104 may be advanced by the roller members 201 into the bite between roller members 202 and 203. With a plurality of sheets therein, the uppermost sheet which is in contact with roller members 202 will be advanced along the passageway in the direction of travel by means of the combined action of roller members 201 and 202. The lowermost sheet in the bite between roller members 202 and 203, however, will be advanced in the direction toward document support tray 101 as a result of the counter driving action of roller members 203. Roller members 203 thus continue to return all but the uppermost sheet toward the stack in a regurgitating manner until there is but a single sheet positioned in the bite between roller members 202 and 203.

It should be noted that the coefficient of friction of the respective materials covering roller members 201, 202, and 203 is essentially the same. It should be further noted that in the preferred embodiment, there are illustrated three roller members 203 on shaft 228 whereas there are but two roller members 202 on shaft 255. In a similar manner, there are illustrated two of the roller members 201 on shaft 262. This arrangement thus provides for a greater driving force acting on the upper side of the uppermost sheet in the stack when the carriage frame and roller members 201 are in the lowered position, than for the opposing forces applied to the lower surface of a sheet by the roller members 203. However, in the event that a plurality of sheets are positioned in the bite between roller members 202 and 203, because a greater frictional force will be exerted against the lowermost surface in contact with roller members 203 due to the relatively low coefficient of friction between successively adjacent sheets positioned therein, the successively adjacent sheets will be advanced by roller members 203 toward the document support tray until but only a single document is positioned therein. It will therefore be apparent that at such time as there is but a single document within the bite between roller members 202 and 203, the combined driving forces of roller members 201 and 202 will be sufficient to overcome the retarding forces of roller members 203 whereby to advance a single document into the bite formed between feed roller members 204 and 205.

A pair of miniature lamps LMP–200 are supported on support plate 223 adjacent roller members 204 at one side of the document feed path. An associated pair of photosensors such as photodiodes PC–200 are supported on support plate 225 adjacent roller members 206 on the side of the feed path opposite that of lamps LMP–200. Photodiodes PC–200 are optically aligned with lamps LMP–200 through suitably arranged apertures in plate members 218 and 219.

The photodiodes PC–200 are electrically connected to the control logic of the facsimile apparatus to control the advancement of sheets from the stack in accordance with the operation of the facsimile apparatus.

Upon detection of the leading edge of a document 104 within the passageway by photodiodes PC–200, solenoid SOL–200 will be energized for a short time duration thereby rotating lever arm 251 into engagement with projection 254 on carriage 252, pivoting the carriage 252 to the raised position out of contact with the sheet 104. This short duration is for the purpose of allowing the roller members 203 to return multiple fed sheets toward the stack, thus removing them from within the bite of roller members 202 and 203. Upon energization of solenoid SOL–200, clutch 280 is deenergized thus interrupting motion of the feeder elements except for the roller members 203 as previously described.

After a suitable time delay, solenoid SOL–200 is deenergized thus lowering arm assembly 252 onto the uppermost surface of a sheet 104. Thereafter, clutch 280 is energized to drive the respective roller members and thus advance the document 104 through the passageway defined by plate members 218 and 219 toward the platen assemblies of the transceiver apparatus. After energizing clutch 280, solenoid SOL–200 is energized to pivot carriage 252 to the raised position.

A pair of miniature lamps LMP–201, similar to lamps LMP–200, are positioned at one side of the passageway defined between inner platen assembly 500 and outer platen assembly 550 at a point preceding roller members 302 and 304, in the direction of travel. An associated pair of photosensors such as photodiodes PC–201 are positioned on the opposite side of the passageway from lamps LMP–201 in optical alignment therewith through suitably arranged apertures in platen members 501 and 551. Photodiodes PC–201 are electrically connected to the control logic of the transceiver apparatus to provide activating and inactivating signals to electromagnetically actuated clutch 280, thereby controllably interrupting the drive to the respective advancing members of the feeder apparatus.

As previously referred to in connection with the high speed input drive generally designated 600 and the output and stepping drive generally designated 650, a pair of miniature lamps LMP–600 and associated photosensors such as photodiodes PC–600 are positioned adjacent the scanning station 720 to indicate the presence or absence of sheets thereat. Photodiodes PC–600 are additionally electrically connected to the control logic of the transceiver apparatus in a manner such as to negate or override the signal generated in response to photodiodes PC–201 when no document is detected by photodiodes PC–600.

As documents 104 are advanced from within the passageway defined between plate members 218 and 219 toward the platen assemblies 500 and 550, the leading edge thereof will be detected by photodiodes PC–201. Upon detection of the leading edge of a document 104 at photodiodes PC–201, a suitable signal from the control logic of the transceiver apparatus will be generated thereby to normally deenergize clutch 280 and thus interrupt advancement of the document 104. However, in the event that no document is detected at the scanning station 720 by the photodiodes PC–600, a signal in response to photodiodes PC–600 will be generated in the control logic of the transceiver apparatus to override or negate the signal responsive to photodiodes PC–201. This sequence of events is normally only encountered wherein the document 104 is the first sheet advanced from a stack and no previous documents 104 remain at the scanning station 720 of the transceiver apparatus.

Where the inactivating signal responsive to photodiodes PC–201 is overridden by an activating signal responsive to photodiodes PC–600, the document 104 in the passageway defined between plates 218 and 219 will be advanced into the bite between roller members 302 and 304 and onto the platen assembly 500 to be advanced toward the scanning station 720 under the influence of high speed input drive 600.

After the document 104 reaches the scanning station 720 and is detected by the photodiodes PC–600, solenoid SOL–200 is deenergized to pivot carriage 252 to the lowered position and clutch member 280 is deenergized to interrupt drive to the respective feeder elements. After a suitable time delay, clutch member 280 is energized to drive the respective feeder elements and advance a sheet 104 from the stack in the manner as previously described for the first sheet 104. As the leading edge of the second sheet 104 is detected by the photodiodes PC–201, a signal will thus be generated by the control logic of the transceiver apparatus to deenergize clutch 280 and hence interrupt advancement of the second sheet 104 through the passageway defined between plate members 218 and 219. In this case, since the first document 104 is still being detected by photodiodes PC–600 at the scanning station 720, the overriding signal responsive thereto from the transceiver control logic will not be generated and the advancement of the second sheet 104 will thus remain interrupted. At such time as when the first document 104 clears the scanning station 720 and is no longer detected by photodiodes PC–600, a suitable signal responsive thereto will be generated by the control logic of the transceiver apparatus to activate clutch 280 overriding the signal generated responsive to photodiodes PC–201 and the second document 104 will be advanced onto the platen assembly 500 in the manner as previously described. Thereafter, subsequent documents are held at the point adjacent photodiodes PC–201 until such time as previous documents clear the scanning station 720 and a signal responsive to photodiodes PC–600 is generated to indicate such.

As practiced in accordance with the present invention, the scanning and recording processes may be accomplished by scanning and recording apparatus of the type disclosed in copending application Ser. No. 758,930 filed concurrently herewith in the names of Richard C. Hansen, Frank L. Headd, Donald W. Schaeffer and Ronald F. Rueckwald and assigned to the same assignee as the instant invention. As disclosed therein, the rotating turret assembly 700 axially positioned at the central axis of the passageway defined between inner platen assembly 500 and outer platen assembly 550 includes a rotatable support member 705 which is rotatably mounted in a support frame casting 701 via bearings 703 and 704. Support frame casting 701 is mounted on the upper frame base member 109 via bolts or other suitable fastening means. Rotatable support member 705 during the operation of the machine is continuously driven at a constant angular velocity by means of a synchronous motor MOT–700 connected to rotatable support member 705 by means of gear reduction drive 702, flexible coupling 714 and drive shaft 715.

Figure 14:
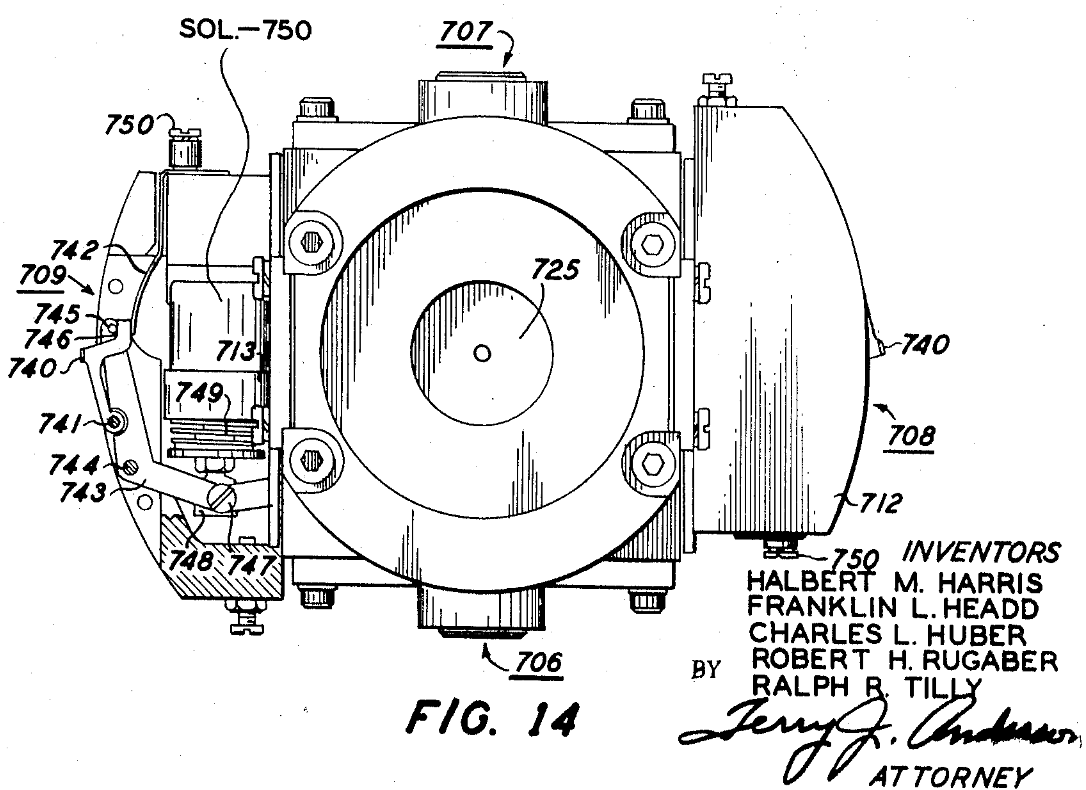
FIG. 14 is a partly broken away sectional view taken along the lines 14–14 of FIG. 13.

As best seen in FIG. 14, rotating turret assembly 700 in the preferred embodiment includes a pair of recording heads 708 and 709 connected thereto and angularly disposed from each other on diagonally opposite sides of rotatable support member 705. In a similar manner turret assembly 700 includes a pair of scanning heads 706 and 707 which are angularly disposed from each other on diagonally opposite sides of rotatable support member 705. Scanning heads 706 and 707 are further angularly disposed from recording heads 708 and 709 so as to provide equal angular spacing between each of the recording heads and the scanning heads. Thus in the preferred embodiment equal angular spacing of 90° is provided between each angularly adjacent recording and scanning head.

A light source such as a quartz lamp LMP–700 is mounted within rotatable support member 705 by means of lamp socket 708 and mounting plate 709. A pair of optical reflector members 716 and 717 are mounted on rotatable support member and extend therein adjacent light source LMP–700 to reflect light outwardly through passages 718 and 719 in rotatable support member 705. Condensing lens assemblies 710 are positioned within passageways 718 and 719 to condense a beam of light reflected by reflector member 716 and 717 for projection onto a document 104 positioned at the scanning station 720.

The scanning heads 706 and 707 each include an objective lens assembly 711 which are supported on rotatable support member 705 in position to receive patterns of light reflected from document 104 at the scanning station as the respective scanning heads traverse the document. Patterns of light thus reflected from document 104 at the scanning station 720 are projected by objective lens assemblies 711 radially within rotatable support member 705 through passages 721 onto an optical reflecting member such as prism 722. Prism 722 is held in position in axial opening 723 by means of a resilient support pad 724.

A photosensitive device such as photodiode 730 is mounted in main support casting 701 by means of diode support 731. Photodiode 730 is positioned adjacent rotatable support member 705 in optical alignment therewith to receive light axially reflected by prism 722 through the passage 723. An aperture plate 725 having a centrally located aperture therein is connected to rotatable support member 705 with the aperture therein being positioned within the optical path between prism 722 and photodiode 730 to produce a small spot of light at diode 730. A pair of optical filters 728 and 729 are pivotably supported on a support member 727 to be selectively positioned into the optical path between prism 722 and aperture plate 725.

The recording heads 708 and 709 which are both similar in nature include an electrographic recording stylus 740 which is reciprocably mounted about pivot pin 741. Stylus 740 is pivoted about pivot pin 741 to the extended position as shown in FIG. 14 under the influence of a conductive leaf spring 742. Leaf spring 742 is preferably of a type which is formed of a bimetallic material. That is, a spring which is formed of two different types of material laminated together as a unitary spring. In the preferred embodiment material such as beryllium copper or phosphor bronze with a copper foil backing attached thereto may be utilized. Such an arrangement produces an over damped spring which prevents bounce and jitter in the recording stylus in the dynamic condition.

A bellcrank lever arm 743 is pivotably mounted within the recording head 709 about pivot pin 744. A pin projection 745 connected to one end of bellcrank lever arm 743 extends therefrom and is engageable with the surface 746 on recording stylus 740. A solenoid SOL–750 is mounted in recording head 709 by means of solenoid mounting block 713. The armature of solenoid SOL–750 is connected at one end thereof to bellcrank lever arm 743 by means of screw 747 and slotted yoke 748. A compression spring 749 biases the armature of solenoid SOL–750 to the extended position in the deenergized condition. Thus in the deenergized condition bellcrank lever arm 743 is pivoted as viewed in FIG. 14 in the clockwise direction about pivot pin 744 under the influence of compression spring 749. As bellcrank lever arm 743 is thus rotated about pivot pin 744, pin 745 contacts the surface 746 on stylus 740 thus pivoting stylus 740 about its respective pivot 741 in opposition to the biasing action of spring 742. However, upon energization of solenoid SOL–750 bellcrank lever arm 743 is pivoted counterclockwise about pivot pin 744 thus allowing stylus 740 to pivot counterclockwise about its respective pivot pin 741 under the influence of leaf spring 742. This action moves stylus 740 to the extended operative position as shown in FIG. 14.

Recording stylus 740 is electrically connected to a high voltage power source through conductive leaf spring 742, connector stud 750 and a slipring assembly located in slipring housing 734. A high voltage switch is opened and closed in response to the received graphic information signals to provide high voltage pulses at recording stylus 740 for charging the record media in a pattern representative of the graphic information.

A planar disc member 733 is attached to rotatable support member 705 to rotate therewith. Disc member 733 includes a plurality of apertures suitably positioned therein which are utilized in enabling and disabling the transmit and receive control logic of the machine in phase with the positioning of the scanning and recording heads with respect to the scanning station. In the preferred embodiment a first pair of apertures are positioned at a first radial distance in disc member 733 at an angular spacing corresponding to the angular spacing of the scan heads 706 and 707. A second pair of apertures are positioned at a second radial distance in disc member 733, the second pair of apertures being radially spaced from the first pair of apertures, at an angular spacing corresponding to the angular spacing of the recording heads 708 and 709.

A pair of miniature lamps LMP–701 and associated photosensors such as photodiodes PC–701, are positioned on opposite sides of disc member 733. Lamps LMP–701 and photodiodes PC–701 are suitably supported on upper frame base member 109 with one of the lamps LMP–701 and the associated photodiode PC–701 being positioned to align with the pair of scan position apertures in disc member 733 and the other of the lamps LMP–701 and associated photodiode PC–701 being positioned to align with the pair of record position apertures in disc member 733 as disc member 733 is rotated. Photodiodes PC–701 are electrically connected to the control logic of the machine to enable the storage circuitry in phase with one of the scan heads, 706 or 707 being at the start of scan position in the transmit mode and to enable the storage circuitry in phase with one of the recording heads 708 or 709 being at the start of scan position in the receive mode.

Thus it may be seen that when the facsimile apparatus is operated in either the transmit or receive modes, motor MOT–700 will be activated via the control logic of the machine to continuously rotate turret assembly 700 about its axis of rotation. In the transmit mode lamp LMP–700 will be continuously energized to project a beam of light from both passageways 718 and 719 via lens assemblies 710. With a document 104 in position at the scanning station 720 the storage circuitry will be enabled to receive electrical information from photodiode 730 in timed relation to light from one of the lamps LMP–701 impinging upon the associated photodiode PC–701 through one of the scan phasing apertures in disc member 733. Thus as scan head 706, for example, is rotated to scan position, the storage circuitry is activated to receive the electrical information generated as scan head 706 traverses document 104. Upon completion of the traverse of scan head 706 across document 104 the storage circuitry is disabled until such time as scan head 707 reaches scan position. At that time the storage circuitry is again activated in timed relation by photodiode PC–701 to receive the electrical information generated as scan head 707 traverses document 104.

In the receive mode, high voltage switch 138 will be controllably actuated in response to electrical information stored in the storage circuitry to produce high voltage charging pulses at the recording stylii 740. With a copy sheet 105 in position at the scanning station 720 the storage circuitry will be enabled to release the stored information to the high voltage switch in timed relation to light from the other of the lamps LMP–701 impinging upon the associated photodiode PC–701 through one of the record phasing apertures in disc member 733. Thus as recording head 708, for example, is rotated to scan position, the storage circuitry is activated to release the stored information to recording stylus 740 as recording head 708 traverses copy sheet 105. Upon completion of the traverse of recording head 708 across copy sheet 105, the storage circuitry is disabled until such time as recording head 709 reaches scan position. At that time the storage circuitry is again activated in timed relation by photodiode PC–701 to release the stored information thus providing high voltage pulses at recording stylus 740 as recording head 709 traverses copy sheet 105.

After the recording or scanning processes are completed at the scanning station in accordance with the operational mode selected, copy sheets or documents are advanced axially to the end of the curved passageway under the influence of the high speed output drive as previously described.

Figure 7:
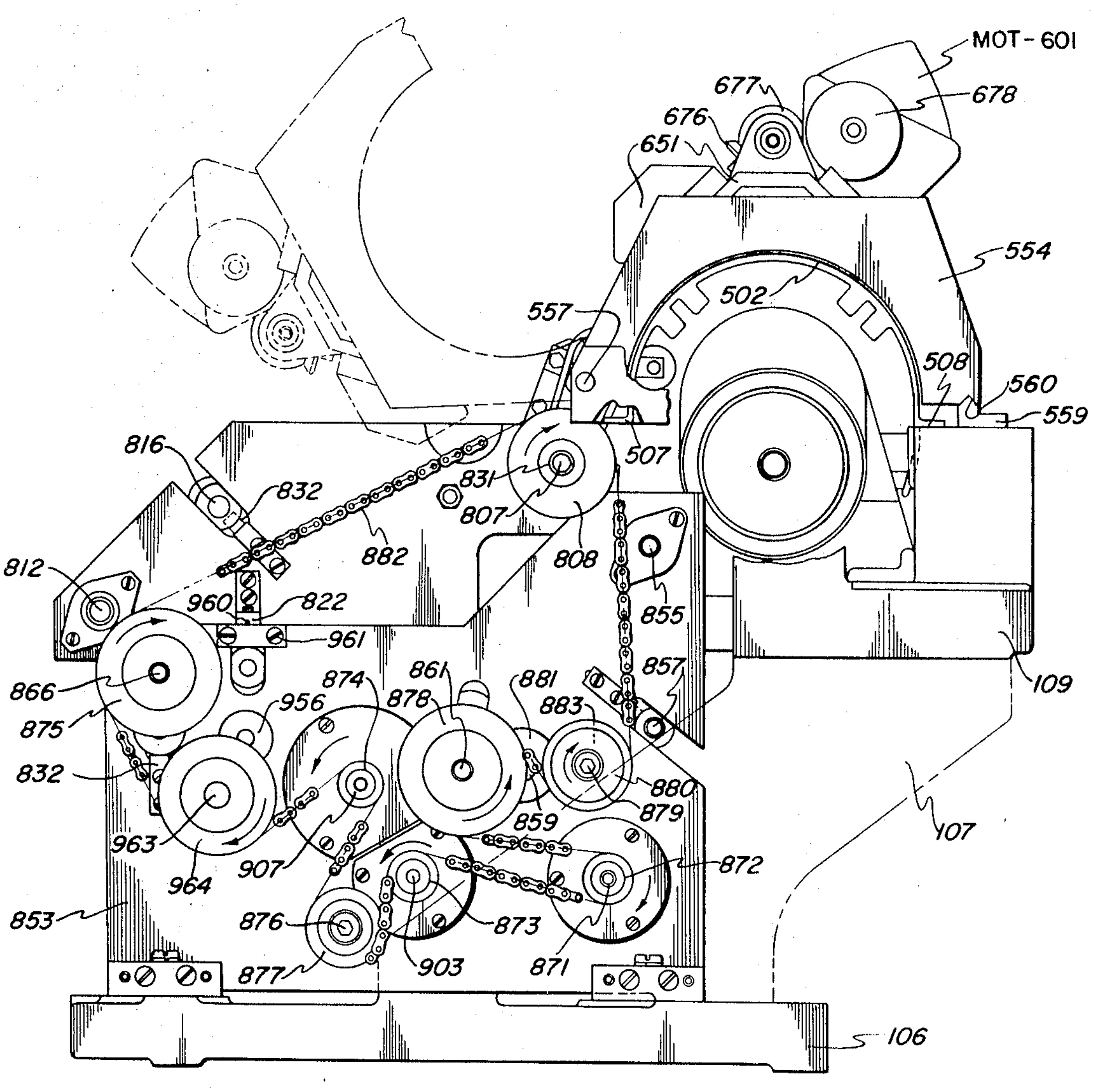
FIG. 7 is a right-hand elevation of the transceiver apparatus.

In the transmit mode, documents 104 are deposited into a receiving tray 103 located at the front of the machine by a document output transport generally designated 800. Document output transport 800 includes a pair of frame plates 802 and 803 which are held in spaced relationship by means of transversely extending support rods 804—806 rigidly connected at the ends thereof to frame plates 802 and 803. A curved plate member 801 having a generally convex surface thereon is supported between frame plates 802 and 803 to provide a guide over which the documents are advanced to receiving tray 103. A drive shaft 807 is rotatably journaled between frame plates 802 and 803 and is adapted to be driven in a counterclockwise direction as viewed in FIG. 11 from either end thereof, depending upon the operational mode of the transceiver apparatus selected. In the receive mode, shaft 807 is driven by means of drive sprocket 808, as shown in FIG. 7, connected thereto by means of a one-way overriding clutch mechanism 831 which clutches are generally well known. In the transmit mode, shaft 807 is driven by means of drive sprocket 810 connected thereto by means of a second one-way overriding clutch mechanism 811 similar to clutch mechanism 831. Thus shaft 807 may be driven in the transmit mode by drive sprocket 810 through clutch 811, with clutch 831 permitting rotation in the one direction without rotating drive sprocket 808. Alternatively, in the receive mode shaft 807 may be driven by drive sprocket 808 through clutch 831 with clutch 811 permitting rotation in the one direction without rotating drive sprocket 810. An idler roller member 809 is rotatably journaled on shaft 807 between frame plates 802 and 803. Alternatively, a plurality of idler members 809 can be substituted for the single continuous idler roller 809 with the individual idler pulley members 809 being axially spaced along shaft 807.

A drive shaft 812 is rotatably journaled between frame plates 802 and 803 adjacent the exit end of guide plate 801. A plurality of drive pulley members 813 are axially spaced along drive shaft 812 to align with idler pulley members 809 on shaft 807. Drive pulley members 813 are rigidly connected to shaft 812 to rotate therewith as shaft 812 is driven under the influence of drive sprocket 814 connected thereto.

A plurality of endless document conveyor belts 815 are entrained about drive pulley members 813 and idler pulley members 809 to advance a document over the convex surface of guide plate 801. An idler shaft 816 having a plurality of idler pulley members 817 axially spaced therealong to align with the conveyor belt members 815 entrained about pulley members 809 and 813, is resiliently biased into engagement with belt members 815 by springs 832 to form a resilient wrap of belt members 815 over the convex surface of guide plate 801. An electrical motor, MOT–800, preferably of the synchronous type is supported on frame plate 802 for driving the document conveyor apparatus. A drive chain 818 is entrained about drive sprocket 820 connected to the output shaft of motor MOT–800, drive sprockets 810 and 814 on shafts 807 and 812 respectively and idler sprocket 819 rotatably journaled on frame plate 802. This driving arrangement permits the document conveyor apparatus to be driven under the influence of motor MOT–800. Thus as endless belt members 815 are driven over the surface of guide plate 801 in the direction as shown in FIG. 11, a document inserted between belt members 815 and guide plate 801 will be advanced toward the receiving tray 103.

The document conveyor apparatus 800 is supported inwardly of the machine by a pair of support brackets 821 connected to the underside of upper base frame member 109 by bolts or other suitable fastening means. Support brackets 821 at the upper ends thereof include an extending portion bifurcated at the ends thereof to engage the bearing supports journaling shaft 807 in frame plates 802 and 803. The extending portions of support brackets 821 thus pivotably support the document conveyor apparatus inwardly of the machine about shaft 807 by engaging the bearing supports which journal shaft 807 in frame plates 802 and 803.

A pair of upstanding frame plates 852 and 853 are connected to lower frame base 106 by bolts or other suitable fastening means. The document conveyor apparatus 800 is supported to the front of the machine by a pair of brackets 822 connected to side frame plates 802 and 803. Brackets 822 project outwardly from frame plates 802 and 803 to engage and rest upon the upper edges of frame plates 852 and 853.

Figure 11:
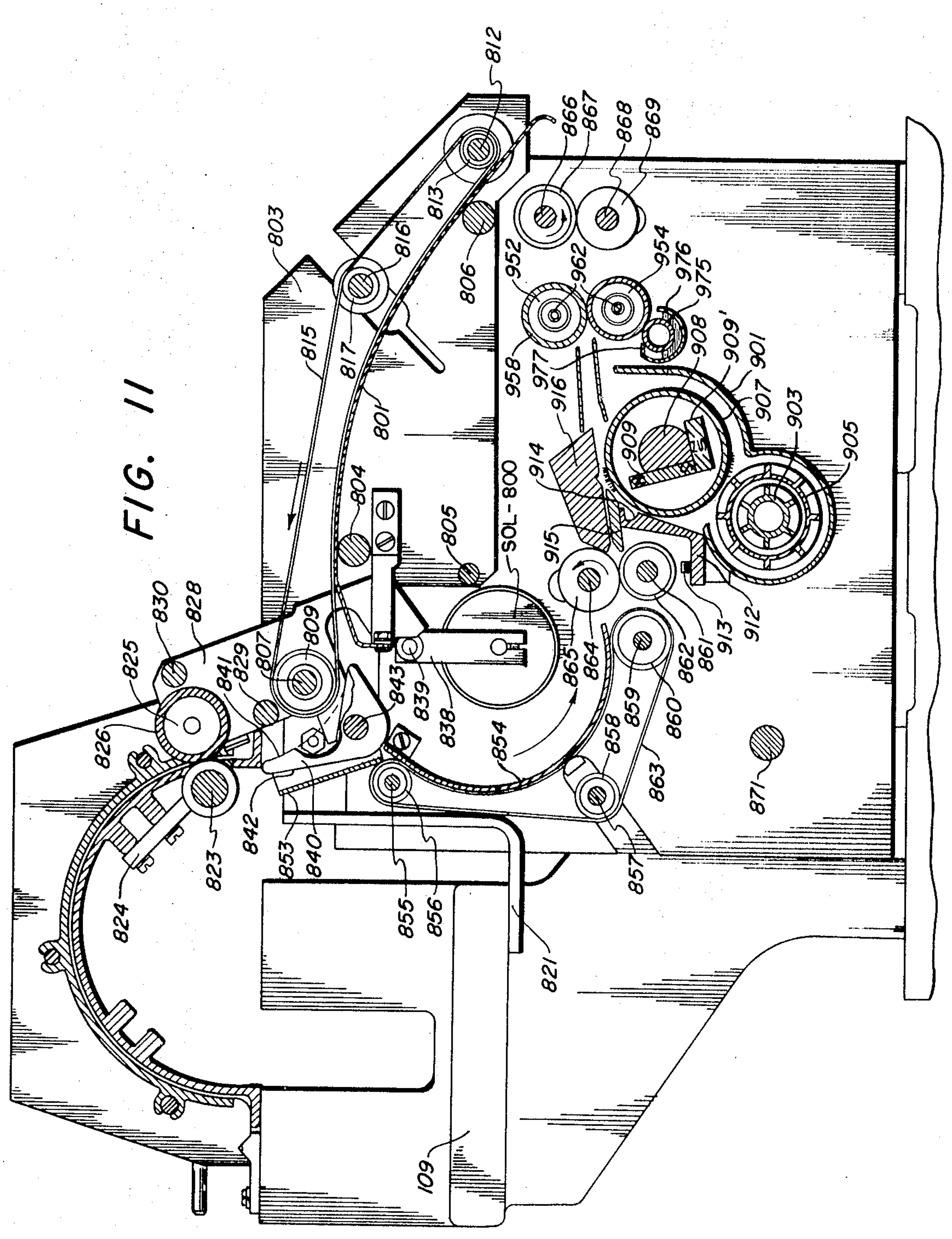
FIG. 11 is a cross-sectional view taken along the lines 11–11 of FIGS. 4 and 6.

A roller member 823 formed from a material having a low coefficient friction on the surface thereof is rotatably journaled at each end from within the inner right-hand platen member 502 as may be seen in FIG. 11, by means of mounting brackets 824. Roller member 823 is suitably positioned to project through a longitudinally extending aperture into the passageway defined between inner platen assembly 500 and outer platen assembly 550 at the lower portion thereof toward the front of the machine. Roller member 823 is tapered at the left-hand end as viewed from the front of the machine to permit a document or copy sheet to be advanced thereover under the influence of the high speed output drive as the document or copy sheet is advanced toward the end of the passageway in position to be withdrawn therefrom.

A friction drive roller 825 having a surface covering 826 of a material characteristically having a high coefficient of friction is rotatably journaled at the ends thereof between a pair of frame plates 827 and 828. Frame plates 827 and 828 are pivotably journaled on shaft 807 just inwardly of the journal supports mounting shaft 807 between frame plates 802 and 803, and are rigidly supported in spaced relationship by transverse support rods 829 and 830 connected at the ends thereof to frame plates 827 and 828. Friction drive roller 825 is spaced from shaft 807 in frame plates 827 and 828 a distance sufficient for friction drive roller 825 to align with roller member 823 when the roller 825 and frame assembly are pivoted counterclockwise about the shaft 807 as viewed in FIG. 11. A longitudinally extending aperture in outer platen assembly 550 positioned directly over roller member 823 permits pivotal movement of friction drive roller 825 into the passageway when pivoted counterclockwise as viewed in FIG. 10 to engage a document or copy sheet supported on inner platen assembly 500 and roller member 823.

Roller member 825 is driven in the counterclockwise direction as viewed in FIG. 10 from shaft 807. As may be seen in FIGS. 4 and 6, an endless flexible chain belt drive 834 is entrained about a pair of mating pulley members 833 and 835, pulley 833 being connected to shaft 807 and pulley member 835 being connected to roller member 825. As may be seen from FIG. 4, the drive to roller member 825 in the preferred embodiment may be intermittently controlled by means of a clutch member such as electromagnetically actuated clutch 836. Alternatively clutch member 836 may be omitted with a direct drive connection being provided between shaft 807 and roller member 825.

Figure 6:
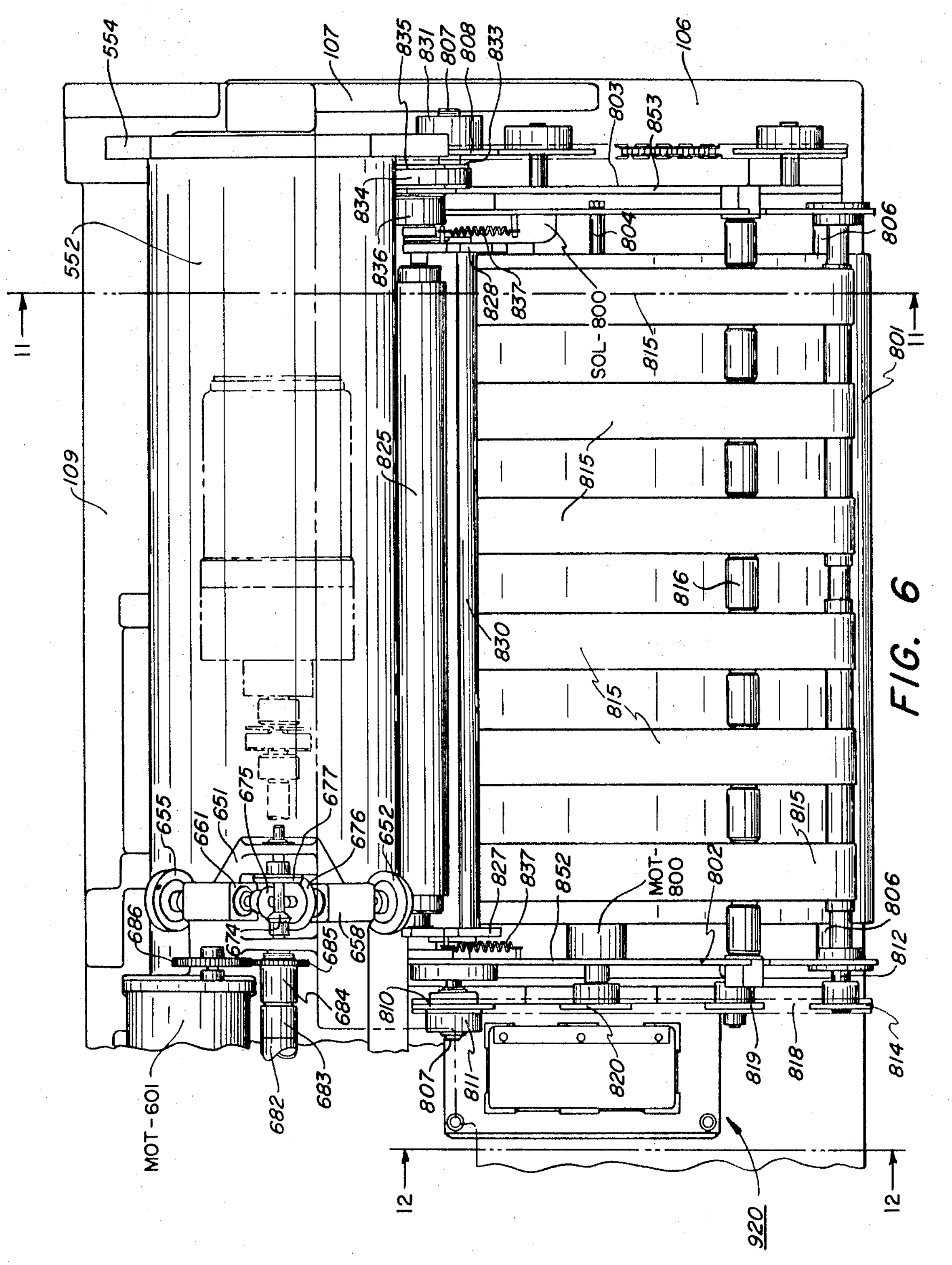
FIG. 6 is a partly broken away plan view showing the right-hand portion of the transceiver apparatus according to the present invention.

Spring members 837, as seen in FIG. 6, connected between frame plates 802 and 803 and the respective roller frame plates 827 and 828, normally resiliently bias the roller member 825 out of engagement with idler roller 823. Roller member 825 is pivoted into engaging relationship with idle roller 823 against the bias of spring members 837 by means of a rotary acting solenoid SOL–800, as viewed in FIG. 11, which solenoids are generally well known. A lever arm 838 having a cam roller 839 at one end thereof is connected at the other end to the armature shaft of rotary solenoid SOL–800. Cam roller 839 is adapted to engage a cam surface on a depending portion of roller frame plate 828. Thus upon generation of a suitable activating signal from the control logic of the machine, lever arm 838 is rotated in the clockwise direction, as shown in FIG. 11, with cam roller 839 engaging the camming surface on the depending portion of roller frame plate 828. As cam roller 839 engages roller frame plate 828 roller member 825 supported between frame plates 827 and 828 is pivoted into engaging relationship with idler roller member 823.

Figure 12:
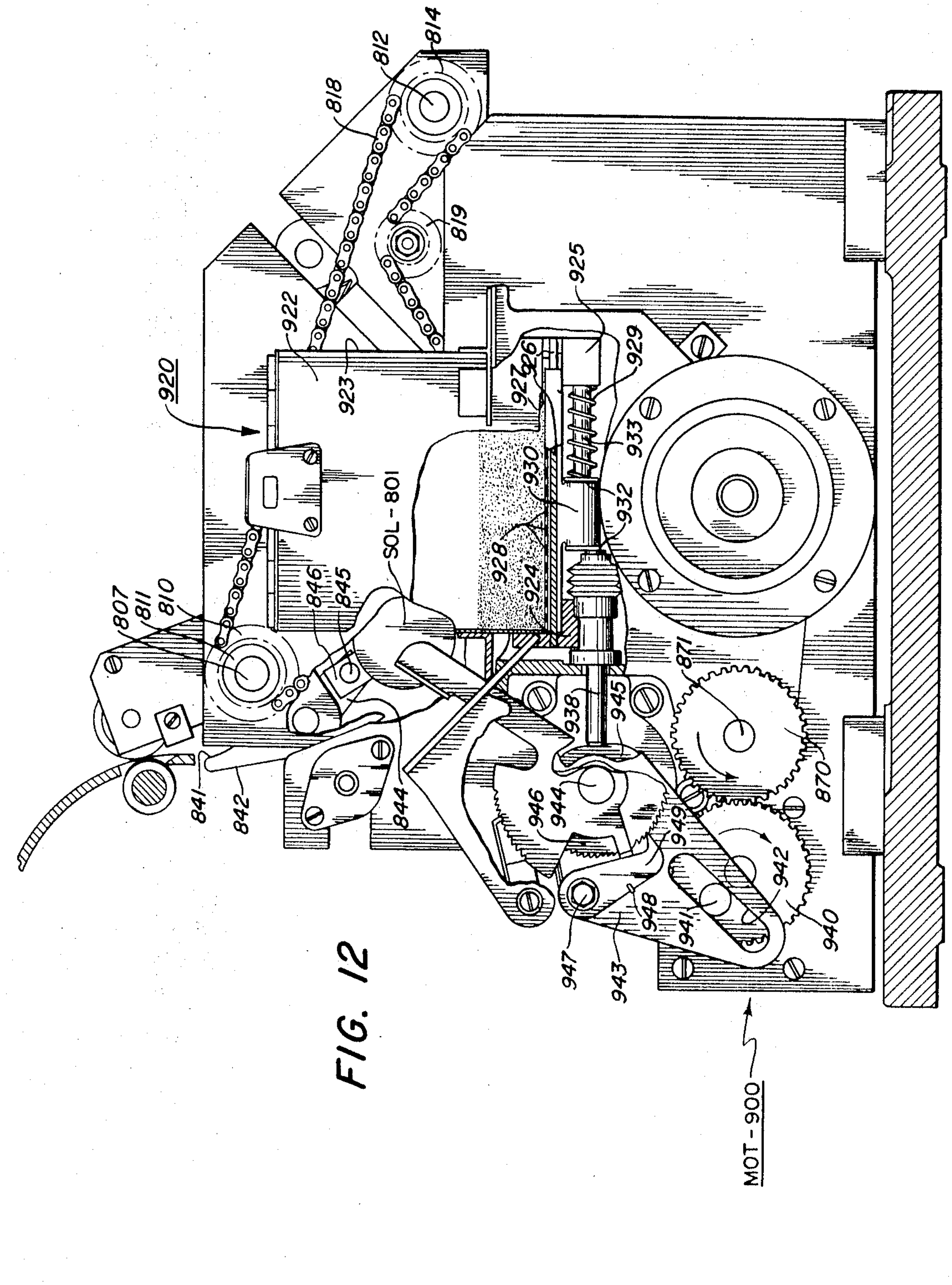
FIG. 12 is a partly broken away sectional view taken from the lines 12–12 of FIGS. 4 and 6.
Figure 13:
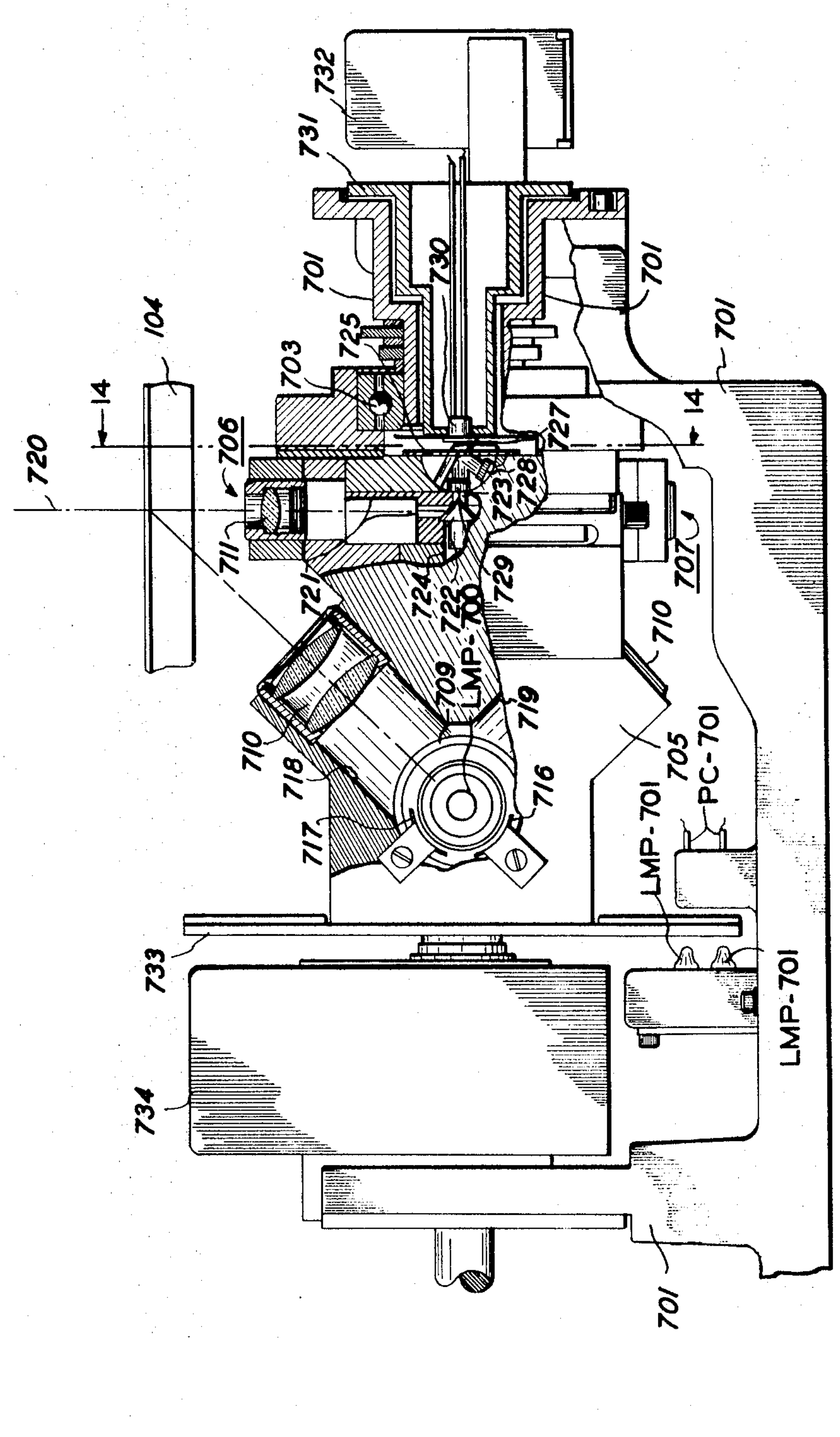
FIG. 13 is a partly broken away section showing the rotating turret assembly of the transceiver apparatus.
Figure 16:
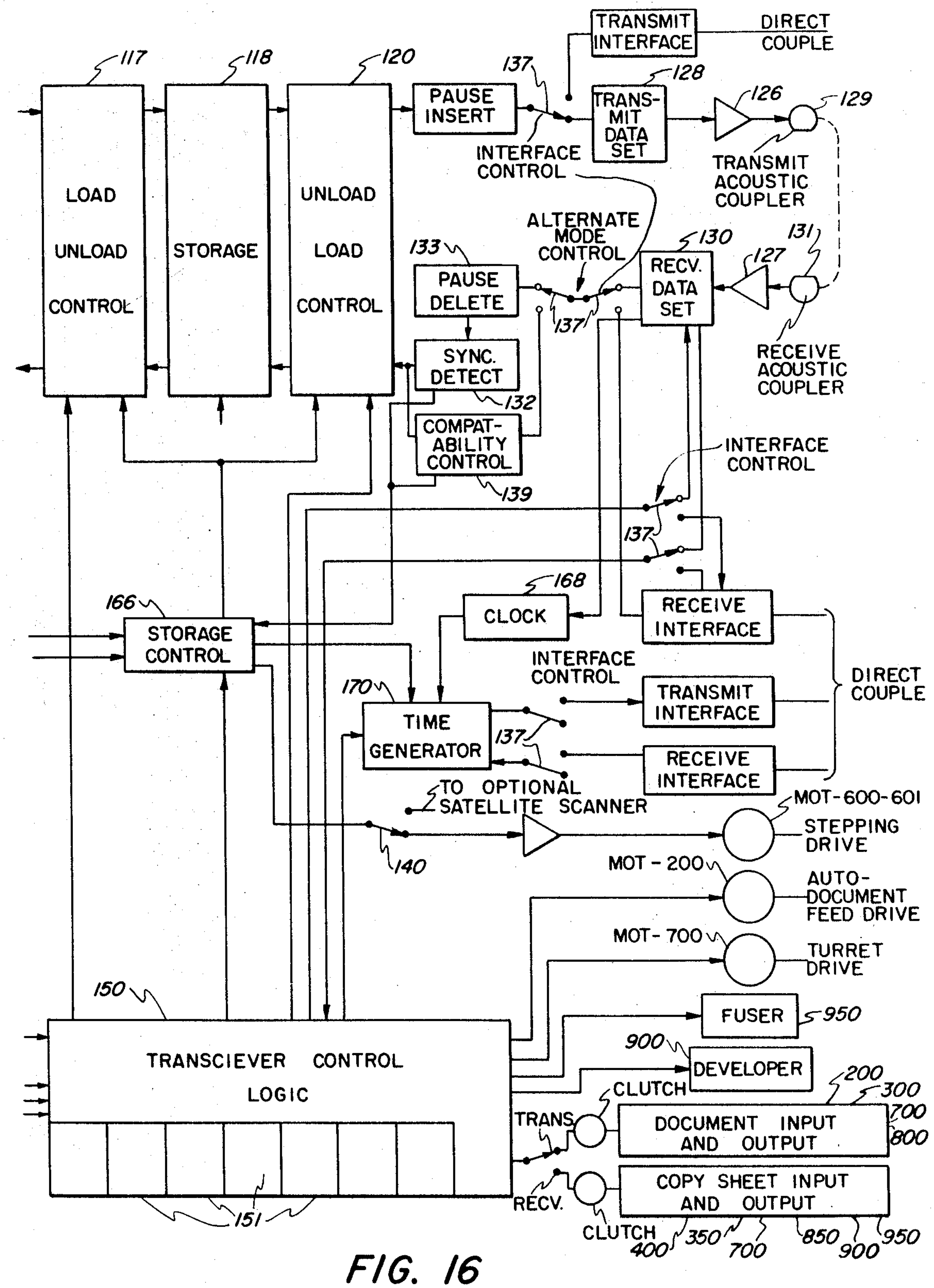

A sheet deflecting gate member 840 having a pair of sheet deflecting surfaces 841 and 842 thereon, is pivotably supported between frame plates 802 and 803 on pivot shaft 843. Gate member 840 is positioned in the path of travel to engage and deflect the leading edges of copy sheets and documents toward the respective conveyor systems. A lever arm 844, as seen in FIG. 12, is rigidly connected at one end to gate member 840 to pivot gate member 840 from a first position in which deflecting surface 841 is in position to deflect documents to the document conveyor apparatus 800, to a second position in which deflecting surface 842 is in position to deflect copy sheets to the copy sheet conveyor apparatus 850 to be subsequently described A rotary solenoid SOL–801 of a type which are generally well known is connected to frame plate 802 for pivoting gate member 840 from the first described position to the second. A lever arm 846 having cam roller 845 connected at one end thereof is connected at the other end to the armature shaft of solenoid SOL–801. Cam roller 845 engages a bifurcation in the unconnected end of lever arm 844 to pivot gate member 840 to the described positions. Gate member 840 is normally biased to the first described position by means of a torsion spring in solenoid SOL–801. Thus upon generation of a suitable activating signal in the control logic of the machine gate member may be pivoted from the first deflecting position as described, to the second, in response to the mode of operation selected for the transceiver.

In the receive mode, copy sheets 105 are deposited into the receiving tray 103 located at the front of the machine by a copy output transport generally designated 850, after having passed through a powder developing apparatus 900 and a fusing apparatus 950.

The pair of upstanding frame plates 852 and 853 connected to lower base frame 106 as previously described support the copy output transport 850, the developer apparatus 900 and fusing apparatus 950 below the document output transport 800. A transversely extending plate member 853, as shown in FIG. 11, connected between frame plates 802 and 803 of the document output transport 800 is positioned to cooperate with the deflecting surface 842 of gate member 840 to form a chute for directing copy sheets 105 to the copy output transport 850.

A curved plate member 854 having a generally convex surface thereon is supported between frame plates 852 and 853 to provide a guide over which copy sheets are advanced to the developer apparatus 900. An idler shaft 855 having a plurality of idler pulley members 856 spaced axially therealong is rotatably journaled between frame plates 852 and 853 adjacent the exit edge of throat plate 853. A drive shaft 859 having a plurality of drive pulley members 860 connected thereto at axially spaced positions to align with the idler pulley members supported on idler shaft 855, is rotatably journaled between frame plates 852 and 853 adjacent the terminal end of guide plate 854. Drive shaft 859 extends through frame plate 853 and has connected thereto a spur gear 881, as shown in FIG. 7.

A plurality of endless copy conveyor belt members 863 are entrained about drive pulley members 860 and idler pulley members 856 to advance a copy sheet over the convex surface of guide plate 854. An idler shaft 857 having a plurality of idler pulley members 858 axially spaced therealong to align with the conveyor belt members 863 entrained about pulley members 856 and 860 is resiliently biased into engagement with belt members 863 to form a resilient wrap of belt members 863 over the convex surface of guide plate 854.

According to the preferred embodiment, copy sheets emerging from the copy sheet conveyor apparatus 850 are advanced past the developer apparatus 900 and fuser apparatus 950 to the receiving tray 103 by means of two sets of pinch rollers, one set being positioned intermediate between the exit end of copy transport 850 and the entrance of developer apparatus 900 and the other set being positioned adjacent the exit end of fusing apparatus 950.

The first pinch roller arrangement comprises a friction drive roller member 862 formed of a resilient material having a high coefficient of friction which is bonded to drive shaft 861 rotatably journaled between frame plates 852 and 853. Drive shaft 861 extends through frame plate 853 and has connected thereto a drive sprocket 878, as shown in FIG. 7. An idler roller member 865 is supported on shaft 864 which is journaled between frame plates 852 and 853 and forms a backing roller for drive roller 862. Backing roller 865 is free floating in frame plates 852 and 853 and is biased into engagement with friction drive roller member 862 by gravity.

The second pinch roller arrangement, similar to the first, comprises a friction drive roller member 867 formed of a resilient material having a high coefficient of friction, which is bonded to drive shaft 866 rotatably journaled between frame plates 852 and 853. Drive shaft 866 extends through frame plate 853 and has connected thereto a drive sprocket 875, as seen in FIG. 7. An idler backing roller member 869 supported on shaft 868 and journaled between frame plates 852 and 853 is normally biased into engagement with friction drive roller member 867 by means of a pair of compression springs such as 832.

In the preferred embodiment, the charged pattern representing the graphic information on the copy sheets 105 may be rendered visible by means of a developing apparatus 900, which is the subject of copending application Ser. No. 759,158 filed concurrently herewith in the names of Buddendeck and Kelsch and assigned to the same assignee as the instant application. Such developing apparatus is of the type which has been generally characterized as magnetic brush development. In such developing apparatus, carrier particles having magnetic properties such as iron filings are admixed with electroscopic toner particles to form the developer material. The developer material is then picked up by a transport member under the influence of a magnetic field and transported into transfer relationship with a copy sheet having a charge pattern of information thereon. The magnetic field which attracts the developer material to the transport member produces a brush array of the developer material as the copy sheet is moved into transfer relationship. The toner particles which have thus far been attracted to the carrier particles under the influence of triboelectric forces are attracted to the charged areas on the copy sheet to render the charge pattern visible.

The developing apparatus 900 is partially enclosed in a housing 901 supported between frame plates 852 and 853. Housing 901 includes a mixing and supply chamber 902 connected to housing 901 through frame plate 852. The lower portion of housing 901 and supply chamber 902 has a internal cross section of generally circular configuration and forms a sump for the developer material utilized in the developer apparatus.

A first conveyor member 903, having one or more helical threads 904 extending thereabout, is rotatably journaled at one end in supply chamber 902, and at the other end thereof in frame plate 853. Conveyor member 903 extends through frame plate 853 by a suitable journal arrangement and has connected thereto a drive sprocket 873 for driving the conveyor assembly.

A second conveyor member 905 having one or more helical threads 906 extending thereabout is supported concentrically about conveyor member 903 and is rigidly connected thereto. The threads 906 on a conveyor member 905 run in a direction opposite to the direction of threads 904 on conveyor member 903, the reason for which will hereinafter be more fully described. In the preferred embodiment threads on conveyor member 903 extend in the left-hand direction while those on conveyor member 905 extend in the right-hand direction. Conveyor member 905 is of a shorter axial dimension than that of conveyor member 903 for a reason which will hereinafter become apparent. That is, the ends of conveyor member 905 are spaced from the ends of conveyor member 903 as may be seen in FIG. 4.

A cylindrical applicator member 907 is positioned above conveyor member 905 to transport developer material into transfer relation with copy sheets 105. Applicator member 907 is rotatably journaled between frame plates 852 and 853 by a shaft 908 within applicator member 907. Shaft 908 at one end extends through frame plate 852 and at the other end through frame plate 853. A drive sprocket 874 coaxial with the end of shaft 908 extending through frame plate 853 is connected to cylindrical applicator member 907 to provide a drive arrangement for rotating applicator member 907 about shaft 908.

Magnetic members 909 and 909′ are supported within cylindrical applicator member 907 by shaft 908. In the preferred embodiment of the invention, magnetic members 909 and 909′ comprise a plurality of permanent magnets which are connected to axially extending faceted portions of shaft 908. Magnet members 909 and 909′ are arranged on shaft 908 to produce a strong magnetic field in the developer pickup area and which extends to the development zone. The arrangement of magnet members 909 and 909′ further produces a weaker magnetic field on the discharge side of the development zone which permits developer material to be returned to the reservoir 901. In the preferred arrangement, magnet members 909 extend in a generally vertical direction toward the development zone from shaft 908. Magnet members 909′ extend in a generally perpendicular relationship to magnet members 909 from shaft 908, with unlike poles being in adjacent abutting relationship.

Figure 4:
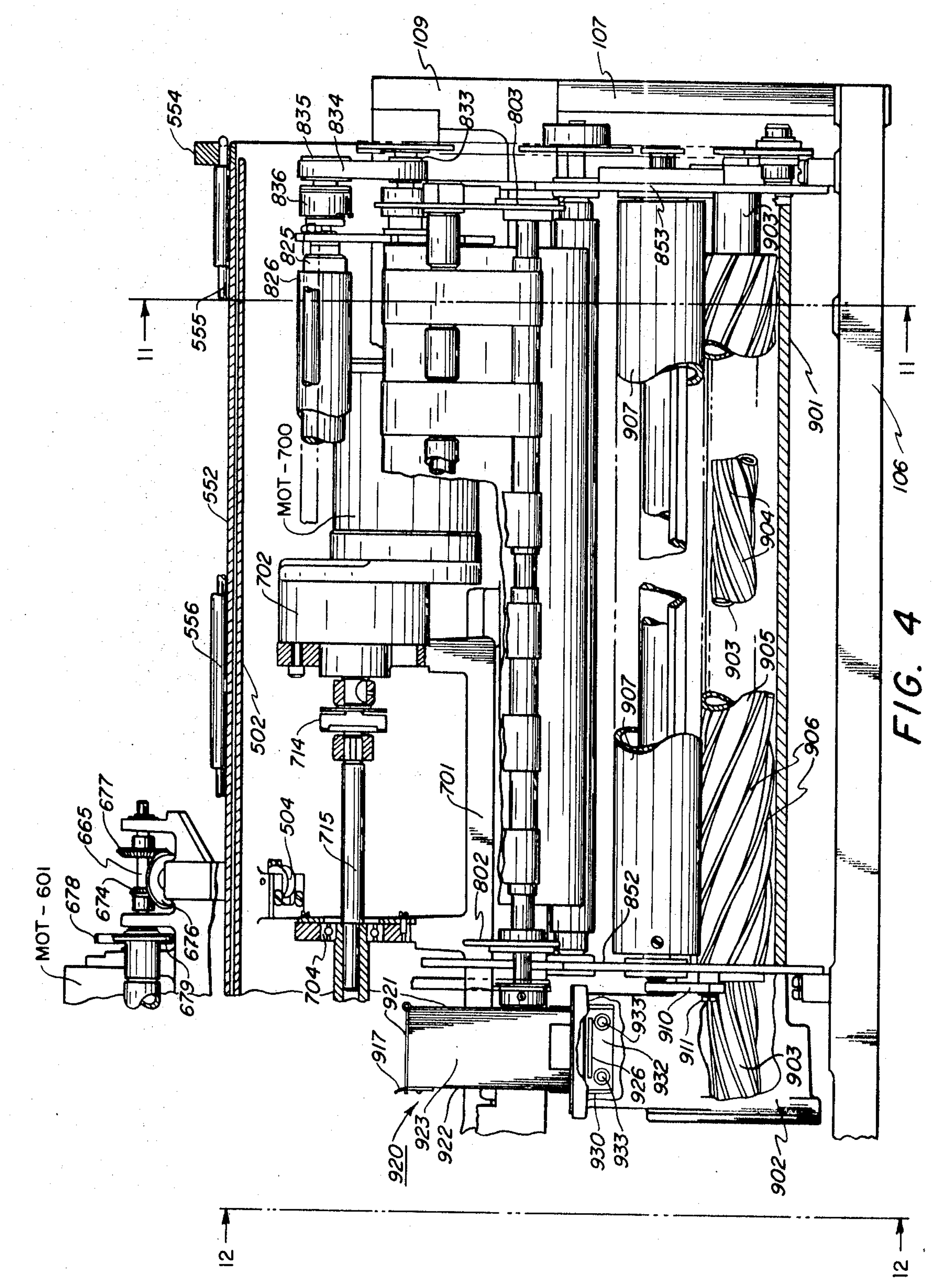
FIG. 4 is a partly broken away front elevation of the right-hand portion of the transceiver apparatus according to the present invention.
Figure 5:
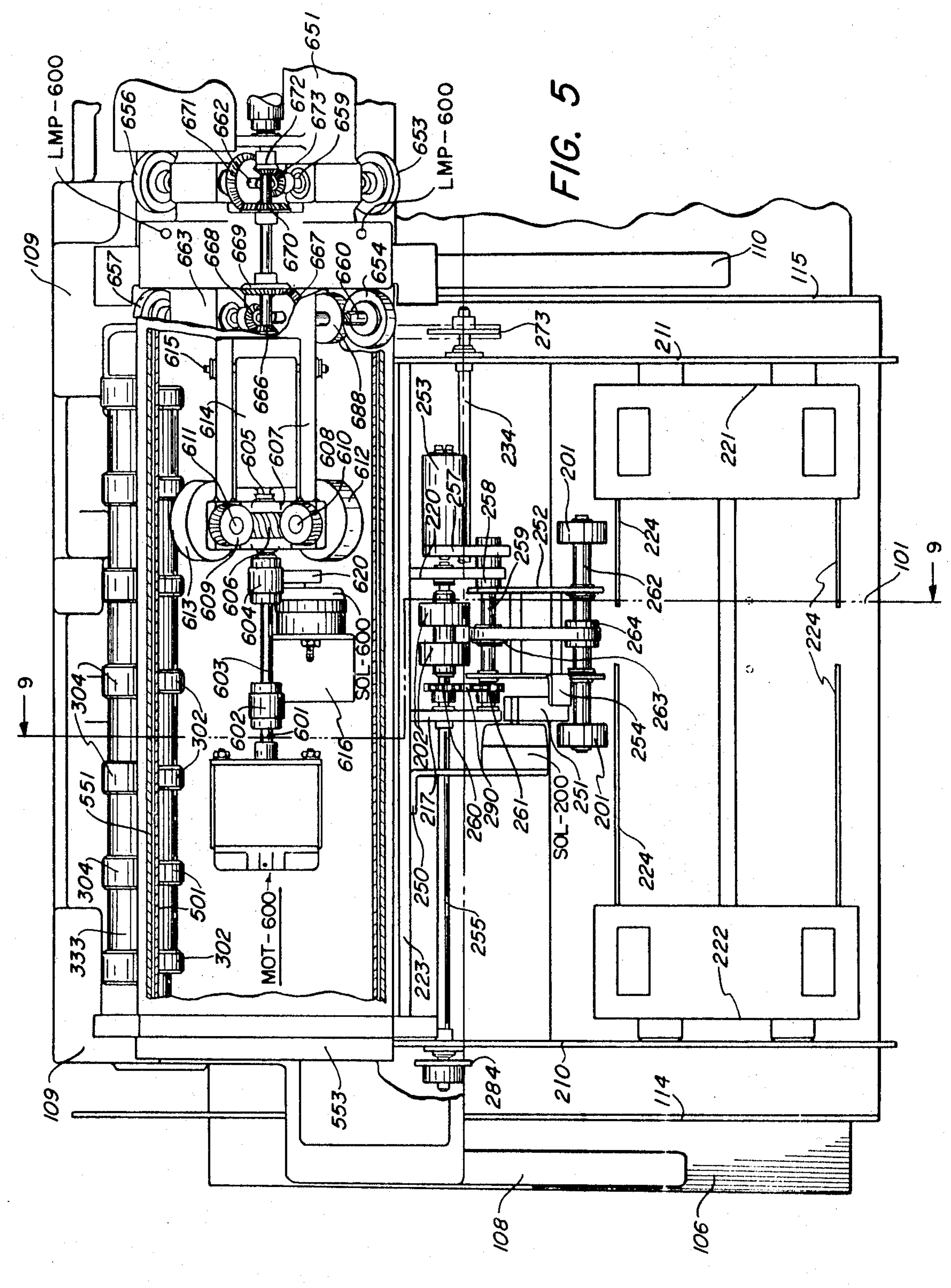
FIG. 5 is a partly broken away plan view showing the left-hand portion of the transceiver apparatus according to the present invention.

Shaft 908 being rotatably journaled with respect to applicator member 907, permits adjustable positioning of the angular displacement of magnet members 909 and 909′ about the axis of shaft 908 and cylindrical applicator member 907. A bar member 910, as shown in FIG. 4, is releasably held against the extending end of shaft 908 by means of screws 911 or other suitable fastening means after magnet members 909 and 909′ have been displaced to the desired angular position. It has been found that optimum results are attained at an angular displacement of magnet members 909 from a vertical axis through shaft 908 of approximately 15° in the counterclockwise direction as viewed in FIG. 11.

As may be seen from FIG. 11, an upwardly extending transverse plate 912 is attached to the main developer housing by means of bolts 913 or other suitable fastening means. Plate member 912 includes a projecting portion 914 which projects toward the surface of applicator member 907. Plate member 912 with projection 914, thereon may be adjustably positioned a predetermined distance from applicator member 907 to regulate the thickness of developer material on applicator member 907 which is brought into transfer relationship with the copy sheets 105.

A platen member 916 is positioned above applicator member 907 to provide firstly an upper guide member for guiding the leading edges of advancing copy sheets 105 from pinch rollers 862 and 865 past applicator member 907. Platen member 916 secondly serves an additional purpose in the development process in obtaining uniform high quality images without undesirable background areas. A negative bias voltage is applied to platen member 916 which serves to eliminate toner material from adhering to the copy sheets in the background areas.

A generally flat transversely extending plate 915 is positioned below platen 916 at an inclination to provide a lower guide member for guiding the leading edges of advancing copy sheets 105 from pinch rollers 862 and 865 over applicator member 907.

In the preferred embodiment an electrical bias on the platen member 916 is provided which is on the order of 50—100 volts. This negative bias serves to form a repelling force of the negatively charged toner particles. The positively charged image areas on the copy sheet however, are unaffected by this negative bias. Therefore as a result of the negative bias on platen member 916 a repelling force is exerted uniformly against the toner material in both the image and nonimage areas. However, this repelling force is of a lesser magnitude than the attractive forces exerted between the positive charged image areas and the negatively charged toner particles. The toner particles thus are attracted to the image areas to render the images visible.

The developer apparatus 900 may be initially charged with developer material through the open area at the upper front adjacent applicator member 907. Preferably, however, the developer is initially charged with developer material by adding the developer material through supply chamber 902.

Mounted atop supply chamber 902 is an automatic toner dispensing apparatus 920 for automatically adding toner material to the developer supply at an adjustable predetermined rate, as toner material from the developer supply is depleted through the development process. Toner dispensing apparatus 920 is preferably of the type disclosed in Hunt, U.S. Pat. No. 3,013,703 and, assigned to Xerox Corporation, Rochester, N.Y. The dispensing apparatus includes a hopper or container for the toner particles to be dispensed which is preferably fabricated from a material such as sheet metal into a rectangular open-ended box having vertical sidewalls 922 and end walls 923. The hopper or container is closed at the upper end by a door 921 hinged at one side end latched in the closed position at the other side by means of spring detent 917. At opposite ends of the hopper are positioned depending bearing blocks or support members 924 and 925 for supporting the dispensing elements of the toner dispenser, the bearing blocks or support members being attached to end walls 923 by screws or other suitable fastening means.

The bottom of the hopper is partially closed by a dispensing plate or platform 926 positioned in spaced vertical relation below the lower edges of the walls of the hopper. The dispensing plate or platform 926 which is as wide as the hopper, may be supported by means of notched extensions of plate 926 engaging mating shoulder portions of support members 924 and 925. The dispensing plate or platform 926 combines with the walls of the hopper to provide a reservoir having narrow elongated discharge outlets or discharge passages 927 along either side for the outflow of toner particles.

To effect substantially uniform flow of toner particles through the outlets or passages 927 there is provided a metering element 928 having a dispensing grid positioned for reciprocating motion in the space between the dispensing platform 926 and the lower edges of the walls of the hopper. The metering element 928 has a dispensing grid formed by a top wall having a series of transverse perforations or slots formed therein and depending sidewalls 930. The ends of depending sidewalls 930 are bent inward at right angles to form flanges to which support plates 932 are secured as by spot welding.

The metering element 928 is supported by parallel guide rods or rod members 933 extending through holes in support plates 932, the ends of the rod members being supported in apertures formed in bearing blocks 924 and 925. Rod members 933 are adjustably secured to bearing blocks 924 and 925 by setscrews or other suitable fastening means and provide a path of movement for the metering element 928 over the dispensing plate 926 as the metering element 928 is reciprocated therealong.

For effecting movement of the metering element, a plunger rod 938 is journaled in an aperture in mixing chamber 902 and is engageable at the inward end with one of the support plates 932. A pair of compression spring members 929 are encircled about the rod members 933 and abut at opposite ends against the bearing block 925 and support plate 932 to normally bias the metering element to the left as viewed in FIG. 12. Thus as the metering element 928 is biased to the left, plunger rod 938 is bent likewise normally biased to the left under the influence of springs 929. The metering element is driven to the right as viewed in FIG. 12 to dispense toner therefrom by a drive arrangement from motor MOT–900. Motor MOT–900 is mounted inwardly on frame plate 852 by bolts or other suitable fastening means with the output shaft therefrom extending through frame plate 852 and having connected thereto a spur gear 940. A cam 945, rotatably journaled on stub shaft 944 is engageable with the exterior end of plunger rod 938. A ratchet gear 946 is rotatably journaled on stub shaft 944 and is rigidly connected to cam member 945 in spaced relationship therewith via a drive bushing or other suitable connecting means rotatable on stub shaft 944. A crank arm 943 is rotatably journaled about stub shaft 944 on the drive bushing connecting cam member 945 and ratchet gear 946. A pawl 949 is pivotably supported on pivot pin 947 and resiliently biased into engagement with ratchet gear 946 by means of torsion spring 948. Crank member 943 is connected to spur gear 940 by means of crank pin 941 on spur gear 940, which is engageable with cam slot 942 in crank member 943. Thus as spur gear 940 is rotated under the influence of motor MOT–900, crank member 943 will be pivoted about stub shaft 944 on the connecting bushing member to advance ratchet gear 946 and connected cam member 945. Thus as cam 945 is rotated, plunger rod 938 will be advanced to the right as viewed in FIG. 12 as the contact point between cam member 945 and plunger rod 938 changes from the low to the high point. After reaching the high point on cam 945, plunger rod 938 and dispensing grid 928 will be returned to the position as shown in FIG. 12 under the influence of coil springs 929. Thus as metering element 928 is reciprocated over the dispensing platform 926 toner particles from within the hopper will be dispensed through the outlets or passages 927 into the mixing chamber 902.

As conveyor member 903 and concentrically mounted conveyor member 905 are rotated in the counterclockwise direction as viewed in FIG. 11, developer material from within supply chamber 902 will be advanced axially along the outer periphery of conveyor member 905 by means of the helical screw threads extending thereabout. At the same time, once the system has reached the operative or equilibrium condition, developer material will be advanced axially along the outer periphery of conveyor member 903 to within supply chamber 902 by means of the oppositely pitched helical screw threads extending about conveyor member 903. As the conveyor members 905 and 903 are rotated, the developer material is thus continuously mixed and agitated in a recirculating fashion passing from supply chamber 902 advancing both angularly and axially in relation to conveyor member 905 into communication with conveyor member 903, then advancing both angularly and axially in relation to conveyor member 903 into communication with conveyor member 905 in supply chamber 902 whereby to obtain and maintain a highly uniform dispersion of toner particles in the developer mixture.

The arrangement of magnetic members 909 and 909' on shaft 908 produces a magnetic field, the lines of force of which extend about applicator member 907 in the direction toward the input side of the transfer station with a greater effective density or intensity than that which extends about applicator member 907 in the direction toward the output side of the transfer station. Thus as applicator member 907 is rotated, developer material will be continuously attracted toward applicator member 907 to be supported thereon under the influence of the strong magnetic field generated by magnetic members 909 and 909'. As applicator member 907 with developer material supported thereon is rotated toward the copy sheets at the transfer station, the projection 91 on transversely extending plate member 912 serves to act as a doctor blade thus providing a uniform thickness of developer material on applicator member 907 being transported into transfer relation with a copy sheet at the transfer station.

On the applicator member 907, the developer material is supported in a manner generally resembling bristles of a brush. This is the result of the tendency of the magnetic particles to align with the lines of force of the magnetic field. At the transfer station, the lines of force of the magnetic field pass through applicator member 907 approximately normal to the surface thereof as a result of the positioning of magnetic members 909 and 909'. Thus as applicator member 907 with the developer material thereon moves through the stationary magnetic field, the orientation of the brush array with respect to applicator member 907 varies in accordance with the direction of the lines of force of the magnetic field. This therefore produces a movement of the magnetic particles supported on applicator member 907 from a tangential position through a vertical position at the maximum field over the respective poles. At the transfer station, the brush array of developer material on applicator member 907 passes through the strong field directly over the upper pole of magnetic members 909. Thus the developer material is brushed against the surface of a copy sheet supported at the transfer station against platen member 916, under the combined action of the rotation of applicator member 907 and the movement produced by the magnetic field. Due to the fact that the developer material conforms to the surface of applicator member 907 in a pattern generally conforming to the lines of force generated by magnetic members 909, the developer material is brushed against a copy sheet positioned against platen member 916.

On the exit side of the transfer station, due to the arrangement of the magnetic members 909 and 909' and the weaker magnetic field as a result thereof, the developer material is only loosely supported on applicator member 907. Because of this weak magnetic field, much of the developer material falls from the surface of applicator member 907 back to the developer housing. Thus, that developer material from which toner material has been depleted at the transfer station is removed from applicator member 907 and returned to the housing. The developer material which is returned to the supply of developer material in the housing member 901 is then mixed with additional developer material therein by the agitating action imparted by conveyor members 903 and 905.

A transversely extending drive shaft 871 is rotatably journaled between frame plates 852 and 853 and at one end thereof has connected thereto a spur gear 870 which meshes with spur gear 940 connected to the output shaft of motor MOT–900. At the other end of drive shaft 871 is connected a drive sprocket 872 for driving the output copy transport, the developer apparatus, and the fusing apparatus.

The fusing apparatus 950 may comprise any of various types of apparatus effective to render the thermoplastic resinous toner material applied to the copy sheets 105 in the image areas, tackified and to thereby fuse the toner material to the copy sheets, making a permanent copy of the image configuration. In the preferred embodiment the fusing apparatus 950 preferably comprises a type of fuser which has been characterized as a roll fuser. That is, a fuser in which two or more roller members are arranged in rolling contact so as to form a pinch roll arrangement, the roller members being heated whereby as the unfused toner images on the copy sheets are advanced through the bite of the pinch roll arrangement, the combination of heat and pressure fuses the toner material to the copy sheet. One type of roll fuser which in the past has worked particularly well is that disclosed in Van Dorn, U.S. Pat. No. 3,268,351 assigned to Xerox Corporation, Rochester, N.Y.

In the preferred embodiment of the invention, a first cylindrical roller member 954 having an annular cross-sectional configuration is rotatably journaled between frame plates 852 and 853 adjacent the copy feed path between applicator 907 of the developing apparatus 900 and the exit set of pinch rollers 867 and 869. Cylindrical member 954 extends at one end through frame plate 853 at which is connected a spur gear 956 for driving the roller member in the clockwise direction as viewed in FIG. 11. Roller member 954 on the exterior periphery thereof is covered with a suitable material 958 to prevent toner offset. Although there may be numerous materials which could be utilized in forming the covering 958, a material which has been found to work particularly well and meets the necessary requirements is a product of tetrafluoroethylene resin sold under the trademark Teflon by the Du Pont Corporation.

A second cylindrical roller member 952 having an annular cross section is rotatably journaled between frame plates 852 and 853 and includes a covering 958 which extends over the exterior periphery thereof similar to that described in connection with roller member 954. Roller member 952 may be resiliently biased into engagement with roller member 954 by an adjustable tension setting means through which the pressure exerted in the bit of roller members 952 and 954 may be adjustably regulated.

Mounted within cylindrical members 952 and 954 are axially extending heating elements 962. According to the preferred embodiment, heating elements 962 preferably comprise a resistive heating element supported about an insulative core member to produce uniform heating of the roller members 952 and 954. The heating elements 962 are electrically connected to the control logic of the machine to be suitably energized when the machine is operated in the receive mode.

To further prevent offset of toner material onto the heated contact surface of roller member 954, a thin film of offset preventing liquid such as silicone oil is applied thereto. A roll-type applicator 975 is suitably journaled between frame plates 852 and 853 in rolling contact with roller member 954. A thin film of the offset preventing liquid, such as silicone oil, contained in housing 976, is picked up by applicator member 975 and transported into contact with heated roller member 954. Oil picked up by applicator 975 and hence roller member 954 is thinned to the desired thickness by means of a doctor blade member 977 adjacent applicator member 975.

From this arrangement, as copy sheets having the developed unfused images thereon are advanced through the bite of roller members 952 and 954, the resulting quantities of heat and pressure transferred to the toner material on the copy sheets is sufficient to render the developed images tackified and hence become fused to the copy sheets 105.

A drive sprocket 964 is rotatably journaled on stub shaft 963 and has connected thereto a spur gear likewise rotatably journaled on stub shaft 963 which meshes with spur gear 956 to drive roller member 954 in the clockwise direction as viewed in FIG. 11. Roller member 952 is driven in the counterclockwise direction as viewed in FIG. 11 by means of the frictional contact between the respective roller members. Thus as drive sprocket 964 is driven clockwise as viewed in FIG. 7, roller members 952 and 954 will be driven to advance a copy sheet through the fuser apparatus 950.

A flexible drive chain 882, as shown in FIG. 7, is entrained about drive sprocket 872 on drive shaft 871 and passes therefrom over drive sprocket 873 on conveyor member 903, over an idler sprocket 877 rotatably journaled on stub shaft 876 connected to frame plate 853, over drive sprocket 874 connected to applicator member 907 then over drive sprocket 964 on stub shaft 963, then over drive sprocket 875 connected to shaft 866, then over drive sprocket 808 which is connected to shaft 807 via clutch 831, then over a second idler sprocket 880 rotatably journaled on stub shaft 879 and connected to frame plate 853, then over drive sprocket 878 connected to shaft 861 and back over drive sprocket 872 on shaft 871 to complete the drive train arrangement. A spur gear 883 rotatably journaled on stub shaft 879 meshes with spur gear 881 connected to shaft 859. Spur gear 883 is drivingly connected to drive sprocket 880 on stub shaft 879 to provide a driving force to spur gear 881 and shaft 859 to complete the output drive arrangement.

From the foregoing arrangement, when the transceiver is operated in the transmit mode, copy sheets 105 will be advanced from within the passageway defined between inner platen assembly 500 and outer platen assembly 550, to the developer apparatus 900 whereat the latent images are rendered visible, then past the fusing apparatus 950 and deposited onto receiving tray 103 by the copy output transport 850.

The facsimile transceiver apparatus according to the present invention is designed to operate as a transceiver in three possible modes. These modes may be designated as a normal mode, a compatibility mode, and a campus mode. In the normal mode, a transceiver at a transmitting location and a transceiver at a receiving location operate via a pair of data sets over commercial telephone lines.

In order to obtain the required resolution within a reasonable period of time when using a transmitting medium having a limited bandwidth capability such as telephone lines, it is necessary to utilize some method of encoding the scanned information. Upon examination of a typical document such as a letter for example, it will be noted that the actual information thereon occupies a very small portion of the actual area of the sheet itself. To scan an entire document and transmit the scanned information in its entirety, results in substantial signal redundancy. Such signal redundancies which are inherent in facsimile output waveforms, due to the fact that the waveform may be two level binary information and the attendant long periods of little or no information transmission, have led to the development of various encoding techniques to reduce such redundancies thereby reducing the waste of transmission time.

There is provided, therefore, a bandwidth compression circuit 116 for encoding the redundancy inherent in the detected facsimile waveform. The derived information modulated light beam from illumination source LMP–700 is converted to electrical signals by photodetector 730. The electrical signals derived therefrom are then amplified at video amplifier 732 for application to slicer 121. Slicer 121 compares the electrical signals with a preset electrical potential to convert the electrical signals into discrete signal levels indicating black or white information detected on the document. The derived sliced electrical signals are then applied to quantizer 122 to bring the signals into a time relation with a clock signal provided by timer generator 170. The output signals from quantizer 122 are thus binary signals quantized into time relation required for synchronous operation, time generator 170 being responsive to clock source 168.

Binary encoder-decoder 116 is utilized for encoding or decoding the binary information when in the transmit or receive modes respectively. The input to the encoder in the transmit mode is the quantized binary video signal representing the black and white areas of information on the original document. The binary waveform is encoded to reduce the redundancy by the generation of code words representative of black or data, and white or background information. One such encoding technique is known as run length encoding in which binary codes corresponding to the various blocks of binary data are transmitted rather than the usual binary data signals. In such a system, a binary code of relatively few binary bits may be sent in lieu of a larger block of video binary data. Reference may be had to Schrieber, U.S. Pat. No. 3,035,121 issued May 15, 1962, for a more complete understanding of run length encoding.

The binary video information is received at the encoder 116 from the scanning and digitizing circuits at a rate higher than the transmission capability of the communication channel. Such an increased scan rate is due to the fact that the purpose of the bandwidth compression circuit is to reduce the inherent redundancy of pictorial material without the loss of information, and to transmit the resultant encoded data with a substantial reduction in required bandwidth time product. Since the bandwidth of the channels under consideration is restricted, increasing the efficiency of the data decreases the time of transmission. In order to optimize the transmission efficiency of the channel, therefore, the information should be transmitted at a rate approaching bandwidth capability of the channel.

After encoding, the data rate of the information from encoder 116 can momentarily be substantially higher than the input, because certain control bits, for example, must be inserted into the data stream in accordance with the binary encoding technique utilized. Load-unload control 117 will receive the encoded binary information from encoder 116 and will transfer such information to the buffer storage unit 118. As the unload-load control 120 is unloading the buffer storage unit 118 at the transmission rate, at times the scan information will be reaching the buffer storage 118 at too fast an input rate. In this instance, therefore, the load-unload control 117, in a manner to be more fully described hereinafter, will emit a signal to interrupt the scanner operation until the buffer storage 118 is sufficiently devoid of information to allow further scanning.

Transmitted along with the encoded binary information is a unique sync word to delineate the separate scan lines. A sync word is unique in the sense that the particular combination of binary digits comprising such a sync word could not, by definition, appear in the output encoded waveform. Such a sync word is inserted into the information wave stream at the unload-load control 120 at a time determined by the respective photosensor PC–701 illustrated in scan index detector 158. A similar record index detector 160 comprising the other photosensor PC–701 is provided for operation in the receive mode, and is selected by index selector 163. The derived signal therefrom is then amplified by the respective amplifiers 162 and 164 and then applied to storage control 166, the operation of which will hereinafter be more fully explained.

After the encoding and storing operations, the encoded waveform must be prepared for transmission to a similar transceiver unit at the remote location. Therefore, at the input and output ends of the transmission medium are circuits for providing compatibility between the transmitter and receiver circuits and the transmission medium. These circuits, commonly called data sets, provide impedance matching and power amplification and/or modulating apparatus. Data sets such as 128 and 130 may, for example, comprise a line driver, radio transmission unit and the like. As fully set forth in copending application, Ser. No. 572,493, acoustic coupling may be utilized for mobility and simplicity in the use of a conventional telephone handset. The encoded waveform is thus transmitted via transmit data set 128, amplifier 126, transmit coupler 129 and an interconnecting telephone network to the receive coupler 131, amplifier 127, and receive data set 130.

In the receive mode, the two-level binary signals derived from the receive data set 130 are applied to a code or sync detector 132 through pause delete 133. This code detector 132 is utilized to detect the unique sync word that was inserted in the binary wave train at the transmitting transceiver. Upon detection of the sync word, the storage control 166, which is essentially a counter, is energized and advanced one count. Such a code detector 132 may comprise logical flip-flop circuitry which is wired to detect the particular configuration of the unique sync word utilized. The output information from the code detector 132 is then passed onto unload-load control 120 which, as described in conjunction with the transmit function of the transceiver, is used to load the buffer storage 118 with the binary encoded information. Load-unload control 117 draws the information from the buffer storage 118 at a rate to be utilized by the recording apparatus. As the information is unloaded from the buffer storage through the load-unload control 117, another code detector 134 will detect the same unique sync word as was detected at code detector 132.

Upon detection of the sync word at 134, a signal is used to count down the storage control 166. The counting up and counting down operation is utilized so that the storage control 166 will be able to detect the number of encoded lines stored at the buffer storage 118. That is, for example, if three lines of information have been stored at the buffer storage 118, frame code detector 132 would have detected three sync words. Thus, storage control 166 would have been advanced three counts, one for each of the detected input sync words. As the information is unloaded from the storage, code detector 134 emits a signal to count down the storage control 166 such that the first line output would indicate that two lines of information remain stored in the buffer storage 118.

After buffer storage, the binary encoded information is directed to the binary decoder 116. This decoder, in a manner similar to the encoder operation described from the transmit mode, reconstructs the signal waveform with its associated redundancy.

A restrobe unit 136 is provided to retime the output binary information to a condition that can be applied to the recording process. The output from the restrobe unit 136 is used to energize a high voltage switch 138 operating at a predetermined operating potential which may be on the order of 1—1.5 kv. The output from the high voltage switch 138 is coupled to the styli 740 on the rotatable support member. As the rotatable support member revolves and traverses the copy sheet 105, the high voltage potential is applied to form a pattern of electrostatic charge in information configuration on the copy sheet in response to the received information. Subsequent to charging at the scanning station, electroscopic developer material may be utilized to develop the image on the copy sheet which is then fused to the copy sheet. A reconstructed facsimile of the original document is then available for use at the receiving location.

The transceiver control logic 150 has connected thereto, the various sensing devices shown as paper sense 136. Various machine interlocks 125 likewise connected to the control logic 150 provide for synchronous sequential operation of the machine. An integrated power supply 135 is connected to the control logic 150 through the control logic 150 to a 115 VAC power source to provide power at the required levels to the various components.

A plurality of controls 151 are utilized to condition the control logic for operation in the several modes as either a transmitter or a receiver. Such selection in turn conditions the subassemblies such as the feeders 200 or 400, the developer 900, fuser 950, output transports 800 or 850, turret assembly 700 and input drives 300 or 350 for operation in the proper sequence of events.

In the campus mode of operation, no data set or telephone lines are utilized. Instead, a coaxial cable is utilized to conduct the binary information from a transceiver at the transmitting location to a transceiver at the receiving location. Provided the length of cable between the transmitting location and the receiving location is not too great, a driver can be utilized which will drive the cable at the quantizing frequency. In such case, it is no longer necessary to encode the data for transmission since the coaxial cable has a much greater transmission capability than the telephone network. Furthermore, in such cases, it is also unnecessary to inhibit quantizing of successive lines as the information flow would not be slowed by data sets. Therefore, a document may be transmitted at a much faster rate in the campus mode than in the previously described normal mode.

It would appear that data need not pass through storage at the transmitter and receiver when operated in the campus mode. However, this would be true only in the event that the scanning heads at the transmitter were precisely 180° apart. Because there may be some error in the alignment of the scanning heads, it is therefore desirable to utilize the storage circuitry 118 to correct for such inadvertencies. At the receiver, likewise, the proper time relationship between the received data and the rotating recording heads can be achieved by processing the data through the storage circuitry.

Thus, there are provided relays 137 which upon selection of operation in the campus mode by activation of an appropriate control 151, are activated via the control logic 150 to bypass encode-decode 116 and data sets 128 and 130.

The compatibility mode of operation further extends the versatility of the instant facsimile apparatus by facilitating operation in a system in which there are included other types of facsimile apparatus unlike that according to the present invention. One type of facsimile apparatus to which operation in the compatibility mode is extended is that disclosed in Reese et al. U.S. Pat. No. 3,325,821 issued June 13, 1967.

Because devices such as Reese et al. do not provide buffer storage means, precise phasing between the scanning member at the transmitting location and the scanning member at the receiving location is required. Thus operation in the compatibility mode renders the facsimile system compatible with other facsimile apparatus which otherwise would prove inoperable in the system.

When operated in the compatibility transmit mode none of the scanned information is loaded into storage for an initial predetermined time period. Instead, a signal is generated from the local time base and loaded into storage which will be effective when received at the receiving location to phase the receiver with the transmitter. After generation of the phasing signal for the predetermined time period the scanned information is stored and transmitted under control of the time base, at a rate and in a format acceptable to the intended receiver.

When operated in the compatibility receive mode the received phasing signal is monitored over a phasing time period to note the leading edge of the restrobe time in the data stream. When an edge is detected, an entire line is monitored to again detect the edge. After repetitious detection of the edge over a predetermined time base within the phasing time period the units are phased. In the event that actual precise phasing has not occurred within the phasing time period the information nevertheless will be loaded into storage as the degree that the units are not in phase will not be great enough to substantially affect copy quality.

As an even further feature of versatility, the facsimile apparatus is provided with an optional input for use in conjunction with an auxiliary or satellite scanner. When such scanner is used, the apparatus is so conditioned by one of the controls 151 to connect the auxiliary scanner into the system via relays 140. The use of special types of scanners in the system provide for a wider range of media which can be utilized, for example, microfilm.

From the foregoing description it may be seen that there is provided an improved facsimile transceiver apparatus adapted for use in a variety of operational modes and which utilizes an electrographic recording process to produce output copy of graphic information with high image resolution at an efficient and reliable data throughput rate.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

We claim:

1. A facsimile transceiver apparatus adapted for use in a facsimile system for converting information on record media into representative electrical signals for transmission to a remote location when operated in a transmit mode and for converting electrical signals received from a remote location into representative information on record media when operated in a receive mode comprising in combination:

- a first media support member having a generally convex semicylindrical surface extending axially therealong;
- a second media support member having a generally concave semicylindrical surface extending axially therealong, said first and second media support members cooperating when in the operative position to form a passageway through which record media are supported and advanced;
- a scanning station axially positioned along said passageway;
- rotatable support means positioned adjacent said scanning station and adapted for rotation about the longitudinal axis of said passageway;
- optical scanning means operatively associated with said rotatable support means for scanning record media supported within said passageway at said scanning station and generating electrical signals representative of information on said record media;
- electrographic recording means operatively associated with said rotatable support means for electrostatically charging record media supported within said passageway at said scanning station in information configuration responsive to representative electrical signals;
- means for energizing said optical scanning means when said transceiver apparatus is operated in a transmit mode and said electrographic recording means when said transceiver apparatus is operated in a receive mode;
- encoding means operatively connected to said optical scanning means for converting electrical signals to binary code signals representative of data and background information;
- decoding means operatively connected to said electrographic recording means for converting said binary code signals to electrical signals representative of data and background information;
- buffer storage means for storing said binary code signals;
- means for advancing record media past said scanning station;
- control means responsive to said buffer storage means, operatively connected to said record media advancing means for controlling the advancement of record media past said scanning station;
- developing means for depositing a quantity of toner material onto the surface of electrostatically charged record media to render the charge pattern of information visible; and
- fusing means for fixing said toner material to said record media in the information configuration.

2. Apparatus according to claim 1 further including:

- a record media support member adapted to receive and support record media in a superposed stacked relationship;
- copy output transport means in communication with said record media passageway and said record media support member for transporting record media onto which information has been recorded from said passageway past said developing means and said fusing means and depositing the record media onto said record media support member;
- document output transport means in communication with said record media passageway and said record media support member for transporting record media having information thereon from said passageway and depositing the record media onto said record media support member; and
- means for directing record media from said passageway to said copy output transport means when said transceiver is operated in the receive mode and for directing record media from said passageway to said document output transport means when said transceiver is operated in the send mode.

3. Apparatus according to claim 1 further including:

- control means for loading and unloading said buffer storage means at predetermined rates.

4. Apparatus according to claim 3 further including:

- sync word generating means for inserting a unique binary sync word into said binary code signals after each optical scan line, and
- monitoring means for counting the number of said sync words in said buffer storage means.

5. Apparatus according to claim 4 further including sheet feeding and separating means for automatically separating and advancing record media in serial fashion into said passageway.

6. Apparatus according to claim 5 wherein said sheet feeding and separating means includes:

- means for supporting in a stacked relationship a quantity of documents to be scanned;
- means for supporting in a stacked relationship a quantity of copy sheets onto which information is to be recorded;
- means for automatically separating and advancing the documents from the stacked relationship into said passageway when said transceiver apparatus is operated in the transmit mode; and
- means for automatically separating and advancing the copy sheets from the stacked relationship into said passageway when said transceiver apparatus is operated in the receive mode.

7. A facsimile transceiver apparatus adapted for use in a facsimile system for converting information on record media into representative electrical signals for transmission to a remote location when operated in a transmit mode and for converting electrical signals received from a remote location into representative information on record media when operated in a receive mode comprising in combination:

- a first media support member having a generally convex surface of arcuate configuration in a first direction and a linear configuration in a second direction;
- a second media support member having a generally concave surface of arcuate configuration in a first direction and a linear configuration in a second direction, said first and second media support members cooperating when in the operative position to form a passageway through which record media are supported and advanced;
- rotatable support means adapted for rotation about the axis of said passageway;
- optical scanning means operatively associated with said rotatable support means for scanning successive parallel line paths on record media supported within said passageway and generating electrical signals representative of information on said record media;
- electrographic recording means operatively associated with said rotatable support means for electrostatically charging successive parallel line paths on record media supported within said passageway in information configuration responsive to representative electrical signals;
- means for activating said optical scanning means when said transceiver apparatus is operated in a transmit mode and said electrographic recording means when said transceiver apparatus is operated in a receive mode;
- digitizing means operatively connected to said scanning means for generating binary data signals from said electrical signals;
- encoding means operatively connected to said optical scanning means responsive to said binary data signals for generating binary code signals representative of data and background information;
- decoding means operatively connected to said electrographic recording means for converting binary code signals to binary data signals of data and background information;
- buffer storage means for storing said binary code signals;
- means for advancing record media past said scanning station;
- control means responsive to said buffer storage means and operatively connected to said record media advancing means for controlling the advancement of record media past said scanning station;

developing means for depositing a quantity of toner material onto the surface of electrostatically charged record media to render the charge pattern of information visible;

fusing means for fixing said toner material to said record media in the information configuration; and media transport means for advancing record media having electrostatic charge patterns thereon past said developing means and said fusing means.

8. Apparatus according to claim 7 further including:

a record media support member adapted to receive and support record media in a superposed stacked relationship;

copy output transport means in communication with said record media passageway and said record media support member for transporting record media onto which information has been recorded from said passageway past said developing means and said fusing means and depositing the record media onto said record media support member;

document output transport means in communication with said record media passageway and said record media support member for transporting record media having information thereon from said passageway and depositing the record media onto said record media support member; and means for directing record media from said passageway to said copy output transport means when said transceiver is operated in the receive mode and for directing record media from said passageway to said document output transport means when said transceiver is operated in the send mode.

9. Apparatus according to claim 7 further including sheet feeding and separating means for automatically separating and advancing record media in serial fashion into said passageway.

10. Apparatus according to claim 9 wherein said sheet feeding and separating means includes:

means for supporting in a stacked relationship a quantity of documents to be scanned;

means for supporting in a stacked relationship a quantity of copy sheets onto which information is to be recorded;

means for automatically separating and advancing the documents from the stacked relationship into said passageway when said transceiver apparatus is operated in the transmit mode; and means for automatically separating and advancing the copy sheets from the stacked relationship into said passageway when said transceiver apparatus is operated in the receive mode.

11. Apparatus according to claim 10 further including:

control means for loading and unloading said buffer storage means at predetermined rates.

12. Apparatus according to claim 11 further including:

sync word generating means for inserting a unique binary sync word into said binary code signals after each optical scan line, and monitoring means for counting the number of said sync words in said buffer storage means.

13. A facsimile transceiver apparatus adapted for use in a facsimile system for converting information on a document into representative electrical signals for transmission to a remote location when operated in a transmit mode and for converting electrical signals received from a remote location into representative information on record media when operated in a receive mode comprising in combination:

stationary support means defining an elongated passageway having a substantially semicircular cross section;

rotatable support means adapted for rotation about the longitudinal axis of said passageway;

optical scanning means operatively associated with said rotatable support means for scanning record media supported within said passageway and generating electrical signals representative of information on said record media;

electrographic recording means operatively associated with said rotatable support means for electrostatically charging record media supported within said passageway in information configuration responsive to representative electrical signals;

developing means for depositing a quantity of toner material onto the surface of electrostatically charged record media to render the charge pattern of information visible;

fusing means for fixing said toner material to said record media in the information configuration; and means for advancing record media past said optical scanning means and said electrographic recording means;

sheet feeding and separating means for automatically separating and advancing record media in serial fashion into said passageway;

sheet feeding and separating means including:

means for supporting in a stacked relationship a quantity of documents to be scanned;

means for supporting in a stacked relationship a quantity of copy sheets onto which information is to be recorded;

means for automatically separating and advancing the documents from the stacked relationship into said passageway when said transceiver apparatus is operated in the transmit mode; and means for automatically separating and advancing the copy sheets from the stacked relationship into said passageway when said transceiver apparatus is operated in the receive mode.

14. Apparatus according to claim 13 further including:

a support member adapted to receive and support record media or documents in a superposed stacked relationship;

record media output transport means in communication with said elongated passageway and said support member for transporting record media onto which information has been recorded from said elongated passageway past said developing means and said fusing means and depositing the record media onto said support member;

document output transport means in communication with said elongated passageway and said support member for transporting documents thereon from said elongated passageway and depositing the documents onto said support member; and means for directing record media from said elongated passageway to said record media output transport when said transceiver apparatus is operated in the receive mode and for directing documents from said elongated passageway to said document output transport means when said transceiver apparatus is operated in the transmit mode.

15. A facsimile transceiver apparatus adapted for use in a facsimile system for converting information on record media into representative electrical signals for transmission to a remote location when operated in a transmit mode and for converting electrical signals received from a remote location into representative information on record media when operated in a receive mode comprising in combination:

stationary support means delineating an elongated passageway having a substantially semicircular cross section;

a scanning station axially positioned along said passageway;

rotatable support means positioned adjacent said scanning station and adapted for rotation about the longitudinal axis of said passageway;

optical scanning means operatively associated with said rotatable support means for scanning record media supported within said passageway at said scanning station and generating electrical signals representative of information on said record media;

electrographic recording means operatively associated with said rotatable support means for electrostatically charging record media supported within said passageway at said scanning station in information configuration responsive to representative electrical signals;

means for energizing said optical scanning means when said transceiver apparatus is operated in a transmit mode and said electrographic recording means when said transceiver apparatus is operated in a receive mode;

developing means for depositing a quantity of toner material onto the surface of electrostatically charged record media to render the charge pattern of information visible;

fusing means for fixing said toner material to said record media in the information configuration; and means for advancing record media past said optical scanning means and said electrographic recording means;

sheet feeding and separating means including;

means for supporting in a stacked relationship a quantity of documents to be scanned;

means for supporting in a stacked relationship a quantity of copy sheets onto which information is to be recorded;

means for automatically separating and advancing the documents from the stacked relationship into said passageway when said transceiver is operated in the transmit mode; and means for automatically separating and advancing the copy sheets from the stacked relationship into said passageway when said transceiver is operated in the receive mode.

16. Apparatus according to claim 15 further including:

a support member adapted to receive and support record media or documents in a superposed stacked relationship;

record media output transport means in communication with said elongated passageway and said support member for transporting record media onto which information has been recorded from said elongated passageway past said developing means and said fusing means and depositing the record media onto said support member;

document output transport means in communication with said elongated passageway and said support means for transporting documents from said passageway and depositing the documents onto said support member; and means for directing record media from said elongated passageway to said record media output transport means when said transceiver apparatus is operated in the receive mode and for directing record media from said elongated passageway to said document output transport means when said transceiver apparatus is operated in the transmit mode.

17. A facsimile transceiver apparatus adapted for use in a facsimile system for converting information on a document into representative electrical signals for transmission to a remote location when operated in a transmit mode and for converting electrical signals received from a remote location into representative information on record media when operated in a receive mode comprising in combination:

a first support member having a generally convex surface of arcuate configuration in a first direction and a linear configuration in a second direction;

a second support member having a generally concave surface of arcuate configuration in a first direction and a linear configuration in a second direction, said first and second support members cooperating when in the operative position to form a passageway through which record media or documents are supported and advanced;

rotatable support means adapted for rotation about the axis of said passageway;

scanning means operatively associated with said rotatable support means for scanning a document supported within said passageway and generating electrical signals representative of information on said record media;

recording means operatively associated with said rotatable support means for recording on record media supported within said passageway in information configuration in response to representative electrical signals;

means for advancing record media or documents past said scanning means and said recording means;

means for supporting documents to be scanned and record media onto which information is to be recorded;

means for automatically advancing documents into said passageway when said transceiver is operated in the transmit mode, and advancing record media into said passageway when said transceiver is operated in the receive mode.

18. Apparatus according to claim 17 wherein:

said support means for said documents and said record media supports documents and record media in a stacked relationship; and said advancing means comprises means for separating said documents and said record media from said stacked relationship for advancement into said passageway.

19. Apparatus according to claim 18 wherein:

said scanning means is optical;

said recording means is of the type which forms a latent electrostatic charge pattern on the record media;

and further including;

developing means for depositing a quantity of toner material onto the surface of said record media to render visible latent charge patterns thereon; and fusing means for fixing said toner material to said record media in image configuration.

20. Apparatus according to claim 18 wherein:

said document and record media support means comprises two separate support trays.

21. A facsimile transceiver apparatus adapted for use in a facsimile system for converting information on a document into representative electrical signals for transmission to a remote location when operated in a transmit mode and for converting electrical signals received from a remote location into representative information on record media when operated in a receive mode comprising in combination:

a first support member having a generally convex semicylindrical surface extending axially therealong;

a second support member having a generally concave semicylindrical surface extending axially therealong, said first and second support members cooperating when in the operative position to form a passageway through which record media or documents are supported and advanced;

a scanning station axially positioned along said passageway;

rotatable support means positioned adjacent said scanning station and adapted for rotation about the longitudinal axis of said passageway;

scanning means operatively associated with said rotatable support means for scanning documents supported within said passageway at said scanning station and generating electrical signals representative of information on said record media;

recording means operatively associated with said rotatable support means for recording on record media supported within said passageway at said scanning station in information configuration in response to representative electrical signals;

means for energizing said scanning means when said transceiver apparatus is operated in a transmit mode and said recording means when said transceiver apparatus is operated in a receive mode;

encoding means operatively connected to said scanning means for converting said electrical signals to binary code signals representative of data and background information;

decoding means operatively connected to said recording means for converting binary code signals to electrical signals representative of data and background information;

buffer storage means for storing said binary code signals;

means for advancing record media past said scanning station;

control means responsive to said buffer storage means, operatively connected to said record media advancing means for controlling the advancement of record media past said scanning station;

developing means for depositing a quantity of toner material onto the surface of electrostatically charged record media to render the charge pattern of information visible; and fusing means for fixing said toner material to said record media in the information configuration.

22. Apparatus according to claim 21 further including means for automatically advancing record media in serial fashion into said passageway, and means for supporting record media, said record media comprising documents to be advanced into said passageway when said transceiver is operated in the transmit mode and record media to be advanced into said passageway when said transceiver is operated in the receive mode.

23. Apparatus according to claim 22 wherein said documents and record media are supported in a stacked relationship and said means for advancing said record media comprises means for separating said record media and said documents from said stacked relationship.

24. Apparatus according to claim 23 wherein:

said scanning means is of the optical type and said recording means is of the electrographic type, and further including developing means for depositing a quantity of toner material onto the surface of a record media to render latent charge patterns thereon, visible, and fusing means for fixing said toner material to said copy sheet.

25. Apparatus according to claim 24 wherein said document and record media support means comprises two separate trays.